US011840314B2

(12) United States Patent
Heyna

(10) Patent No.: US 11,840,314 B2
(45) Date of Patent: Dec. 12, 2023

(54) MULTI-SPROCKET ASSEMBLY AND REAR WHEEL ASSEMBLY FOR A BICYCLE WITH A DERAILLEUR SYSTEM

(71) Applicant: SRAM DEUTSCHLAND GmbH, Schweinfurt (DE)

(72) Inventor: Sebastian Heyna, Dittelbrunn-Ot Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

(21) Appl. No.: 17/412,765

(22) Filed: Aug. 26, 2021

(65) Prior Publication Data
US 2022/0063761 A1 Mar. 3, 2022

(30) Foreign Application Priority Data

Sep. 1, 2020 (DE) .................... 10 2020 005 366.1
Jul. 2, 2021 (DE) .................... 10 2021 003 431.7

(51) Int. Cl.
*B62M 9/06* (2006.01)
*B62M 9/10* (2006.01)
*B62M 9/04* (2006.01)

(52) U.S. Cl.
CPC ................ *B62M 9/06* (2013.01); *B62M 9/04* (2013.01); *B62M 9/10* (2013.01)

(58) Field of Classification Search
CPC .......... B62M 9/10; B62M 9/105; B62M 9/04; B62M 9/06; B62M 9/12; F16H 55/30
See application file for complete search history.

(56) References Cited

U.S. PATENT DOCUMENTS

| 4,102,215 A | 7/1978 | Nagano et al. |
| 4,353,447 A * | 10/1982 | Bes .......................... B62M 9/10 |
| | | 192/64 |
| 5,503,600 A * | 4/1996 | Berecz .................... F16H 55/30 |
| | | 474/160 |

(Continued)

FOREIGN PATENT DOCUMENTS

| DE | 60022250 T2 | 6/2006 |
| DE | 102011107162 A2 | 1/2013 |

(Continued)

*Primary Examiner* — Minh Truong
*Assistant Examiner* — Raveen J Dias

(57) ABSTRACT

A multi-sprocket assembly for a bicycle rear wheel assembly comprising a multi-sprocket arrangement and a locking screw arrangement. The multi-sprocket arrangement is configured to be couplable to a driver of the wheel assembly in a torque-transmitting manner and comprises at least eleven sprockets. The multi-sprocket assembly is configured such that at least two of the smallest sprockets are axially fixed to the driver via the locking screw arrangement. The locking screw arrangement has a shaft portion for receiving at least one sprocket. The shaft portion has an axially outer stop portion at one end region and at least one external thread at an opposite end region. The external thread configured to be screwed into an associated internal thread to fix the locking screw arrangement. The external thread has an outer diameter which is larger than an outer diameter of a shaft portion region that receives the at least one sprocket.

14 Claims, 14 Drawing Sheets

(56) References Cited

U.S. PATENT DOCUMENTS

| | | | |
|---|---|---|---|
| 6,264,575 B1* | 7/2001 | Lim | F16D 41/30 |
| | | | 192/64 |
| 6,382,381 B1* | 5/2002 | Okajima | B60B 1/041 |
| | | | 192/64 |
| 6,428,437 B1* | 8/2002 | Schlanger | B62M 9/12 |
| | | | 474/160 |
| 6,488,603 B2* | 12/2002 | Lim | B62M 9/10 |
| | | | 192/64 |
| 7,011,592 B2* | 3/2006 | Shahana | B62M 9/10 |
| | | | 474/160 |
| 7,351,171 B2* | 4/2008 | Kanehisa | B60B 27/04 |
| | | | 301/111.02 |
| 7,931,553 B2* | 4/2011 | Tokuyama | B62M 9/10 |
| | | | 474/81 |
| 8,641,151 B2* | 2/2014 | Kamada | B62M 9/125 |
| | | | 192/64 |
| 8,956,254 B2* | 2/2015 | Tokuyama | B62M 9/12 |
| | | | 474/160 |
| 9,193,416 B2* | 11/2015 | Tokuyama | B62M 9/10 |
| 9,446,815 B2* | 9/2016 | Lin | B62M 9/10 |
| 9,533,735 B2* | 1/2017 | Braedt | F16H 9/24 |
| 9,580,144 B2* | 2/2017 | Bernardele | B62M 9/10 |
| 9,604,698 B2* | 3/2017 | Tsai | F16H 55/30 |
| 9,771,127 B2* | 9/2017 | Braedt | F16D 1/108 |
| 9,822,865 B2* | 11/2017 | Chen | B60B 27/047 |
| 9,868,491 B1* | 1/2018 | Oishi | B62M 9/10 |
| 9,994,285 B2* | 6/2018 | Tokuyama | F16H 55/30 |
| 10,053,187 B2* | 8/2018 | Kamada | B62M 9/10 |
| 10,059,400 B2* | 8/2018 | Tokuyama | B62M 9/10 |
| 10,093,388 B2* | 10/2018 | Kamada | F16H 55/30 |
| 10,093,390 B2* | 10/2018 | Braedt | F16H 9/24 |
| 10,112,681 B2* | 10/2018 | Oishi | B62M 9/10 |
| 10,315,727 B2* | 6/2019 | Nishimoto | F16H 55/30 |
| 10,377,174 B2* | 8/2019 | Fujita | B60B 27/021 |
| 10,507,690 B2* | 12/2019 | Fujita | B60B 27/0021 |
| 10,752,320 B2* | 8/2020 | Oka | B60B 27/047 |
| 10,946,931 B2* | 3/2021 | Fujita | B62M 9/10 |
| 10,946,932 B2* | 3/2021 | Braedt | F16H 9/24 |
| 10,946,933 B2* | 3/2021 | Braedt | B62M 9/10 |
| 11,034,412 B2* | 6/2021 | Reinbold | B62M 9/122 |
| 11,059,541 B2* | 7/2021 | Fujita | B60B 27/023 |
| 11,072,203 B2* | 7/2021 | Bots | F16D 1/10 |
| 11,097,807 B2* | 8/2021 | Fujita | B62L 1/005 |
| 11,179,967 B2* | 11/2021 | Fujita | B60B 27/023 |
| 11,180,217 B2* | 11/2021 | Tokuyama | B62M 9/10 |
| 11,192,605 B2* | 12/2021 | Braedt | B62M 9/10 |
| 11,220,309 B2* | 1/2022 | Fujita | B62M 9/121 |
| 11,279,442 B2* | 3/2022 | Oka | B60B 27/047 |
| 11,305,837 B2* | 4/2022 | Komatsu | F16D 1/10 |
| 11,332,213 B2* | 5/2022 | Fujita | B62M 9/10 |
| 11,383,553 B2* | 7/2022 | Van Den Brand | B62M 9/10 |
| 11,465,710 B2* | 10/2022 | Fukumori | B62M 9/10 |
| 2001/0039224 A1* | 11/2001 | Lim | B62M 9/10 |
| | | | 474/158 |
| 2003/0171180 A1* | 9/2003 | Shahana | B62M 9/10 |
| | | | 474/160 |
| 2005/0009654 A1* | 1/2005 | Kanehisa | B60B 27/04 |
| | | | 474/160 |
| 2008/0188336 A1* | 8/2008 | Tokuyama | B62M 9/10 |
| | | | 474/160 |
| 2011/0092327 A1* | 4/2011 | Oishi | B62M 9/10 |
| | | | 474/160 |
| 2011/0130233 A1* | 6/2011 | Tokuyama | B62M 9/10 |
| | | | 474/116 |
| 2012/0225745 A1* | 9/2012 | Oishi | B62M 9/121 |
| | | | 474/160 |
| 2012/0322598 A1* | 12/2012 | Lin | B62M 9/10 |
| | | | 474/160 |
| 2013/0017914 A1* | 1/2013 | Braedt | B62M 9/10 |
| | | | 403/299 |
| 2013/0035183 A1* | 2/2013 | Tokuyama | B62M 9/10 |
| | | | 474/78 |
| 2015/0024884 A1* | 1/2015 | Braedt | F16H 9/24 |
| | | | 474/78 |
| 2015/0133249 A1* | 5/2015 | Tsai | B62M 9/12 |
| | | | 474/160 |
| 2016/0083045 A1* | 3/2016 | Lin | F16H 55/30 |
| | | | 474/160 |
| 2016/0114859 A1* | 4/2016 | Tsai | B62M 9/10 |
| | | | 474/160 |
| 2016/0167737 A1* | 6/2016 | Tokuyama | B62M 9/10 |
| | | | 474/160 |
| 2016/0200395 A1* | 7/2016 | Braedt | B62M 9/10 |
| | | | 403/299 |
| 2017/0021667 A1* | 1/2017 | Chen | F16H 55/12 |
| 2017/0073043 A1* | 3/2017 | Braedt | B62M 9/10 |
| 2017/0341707 A1* | 11/2017 | Braedt | F16D 1/108 |
| 2017/0361901 A1* | 12/2017 | Tokuyama | F16H 55/30 |
| 2017/0369124 A1* | 12/2017 | Kamada | F16H 55/30 |
| 2018/0009505 A1* | 1/2018 | Kamada | B62M 9/10 |
| 2018/0022415 A1* | 1/2018 | Oishi | B62M 9/12 |
| | | | 474/160 |
| 2018/0022416 A1* | 1/2018 | Oishi | B62M 9/12 |
| | | | 474/160 |
| 2018/0105229 A1* | 4/2018 | Reinbold | B62M 9/10 |
| 2018/0215444 A1* | 8/2018 | Reinbold | B62M 9/10 |
| 2018/0229801 A1* | 8/2018 | Nishimoto | F16H 55/30 |
| 2018/0290711 A1* | 10/2018 | Tokuyama | B62M 9/10 |
| 2018/0345723 A1* | 12/2018 | Fujita | B60B 27/023 |
| 2018/0346064 A1* | 12/2018 | Fujita | B62M 9/10 |
| 2018/0346065 A1* | 12/2018 | Fujita | B62M 9/10 |
| 2018/0346067 A1* | 12/2018 | Fujita | F16H 55/30 |
| 2018/0370596 A1* | 12/2018 | Braedt | F16H 55/30 |
| 2018/0370597 A1* | 12/2018 | Braedt | B62M 9/10 |
| 2019/0023069 A1* | 1/2019 | Van Den Brand | B62M 11/14 |
| 2019/0031286 A1* | 1/2019 | Fujita | F16D 41/30 |
| 2019/0047324 A1* | 2/2019 | Fujita | B62M 9/10 |
| 2019/0061874 A1* | 2/2019 | Fujita | F16H 55/30 |
| 2019/0063585 A1* | 2/2019 | Fujita | B62M 9/12 |
| 2019/0084645 A1* | 3/2019 | Emura | F16H 57/0025 |
| 2019/0084647 A1* | 3/2019 | Fukunaga | F16H 55/30 |
| 2019/0092425 A1 | 3/2019 | Fujita | |
| 2019/0092426 A1* | 3/2019 | Oka | B60B 27/023 |
| 2019/0092427 A1* | 3/2019 | Oka | B62M 9/10 |
| 2019/0127022 A1* | 5/2019 | Komatsu | F16H 55/30 |
| 2019/0225301 A1* | 7/2019 | Emura | F16H 55/12 |
| 2019/0225302 A1* | 7/2019 | Emura | B62M 9/10 |
| 2019/0232717 A1* | 8/2019 | Fujita | B62M 9/10 |
| 2019/0359284 A1* | 11/2019 | Fukunaga | F16H 55/30 |
| 2020/0062033 A1* | 2/2020 | Bots | F16D 1/10 |
| 2020/0298619 A1* | 9/2020 | Oka | B60B 27/023 |
| 2020/0300307 A1* | 9/2020 | Oka | B62M 9/10 |
| 2021/0031560 A1* | 2/2021 | Civiero | F16H 55/30 |
| 2021/0031876 A1* | 2/2021 | Civiero | B62M 9/10 |
| 2021/0114688 A1* | 4/2021 | Li | F16H 55/30 |
| 2021/0131547 A1* | 5/2021 | Civiero | F16H 55/12 |
| 2021/0171155 A1* | 6/2021 | Fukumori | B62M 9/10 |
| 2021/0284281 A1* | 9/2021 | Carrasco Vergara | B62M 9/12 |
| 2021/0339825 A1* | 11/2021 | Tsai | B62M 9/10 |
| 2021/0339826 A1* | 11/2021 | Fujita | F16D 41/30 |
| 2022/0063762 A1* | 3/2022 | Braedt | B62K 25/02 |
| 2022/0153388 A1* | 5/2022 | Oka | B62M 9/12 |
| 2022/0185013 A1* | 6/2022 | Lin | B62M 9/10 |
| 2022/0234681 A1* | 7/2022 | Fujita | B62M 9/10 |
| 2022/0258833 A1* | 8/2022 | Li | B62M 9/10 |
| 2022/0348286 A1* | 11/2022 | Fujita | B62M 9/10 |
| 2022/0348287 A1* | 11/2022 | Fujita | F16H 55/30 |

FOREIGN PATENT DOCUMENTS

| | | |
|---|---|---|
| DE | 10 2012 006 771 A1 | 10/2013 |
| DE | 10 2014 010 700 A1 | 1/2015 |
| DE | 102017004853 A2 | 3/2018 |
| DE | 102018126529 A1 | 5/2019 |
| EP | 1342657 B1 | 5/2008 |
| EP | 2987715 A1 | 2/2016 |
| EP | 3109062 A1 | 12/2016 |
| EP | 3819201 A1 | 5/2021 |

* cited by examiner

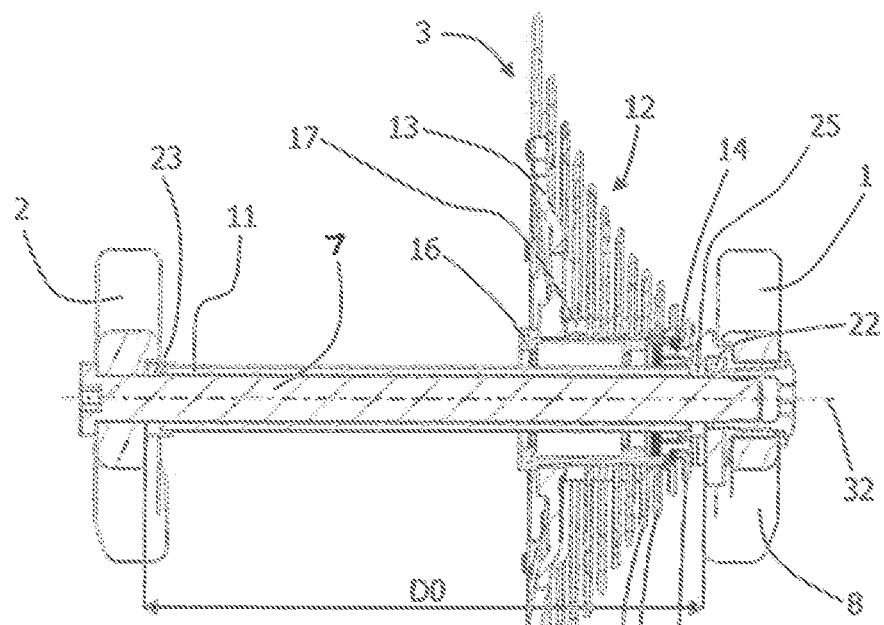
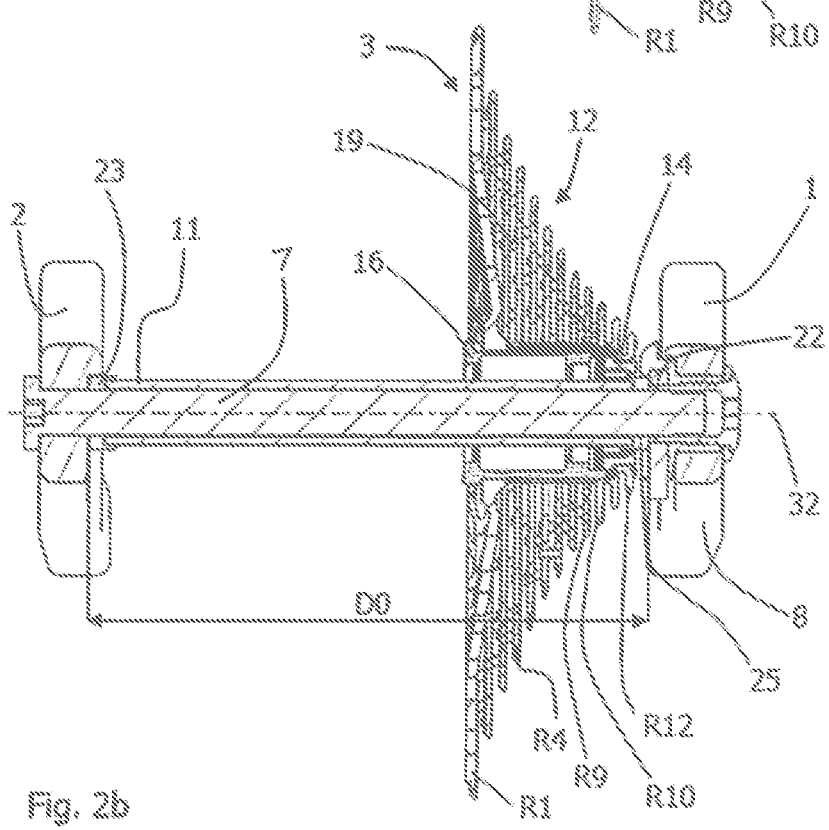
Fig. 2a
Fig. 2b

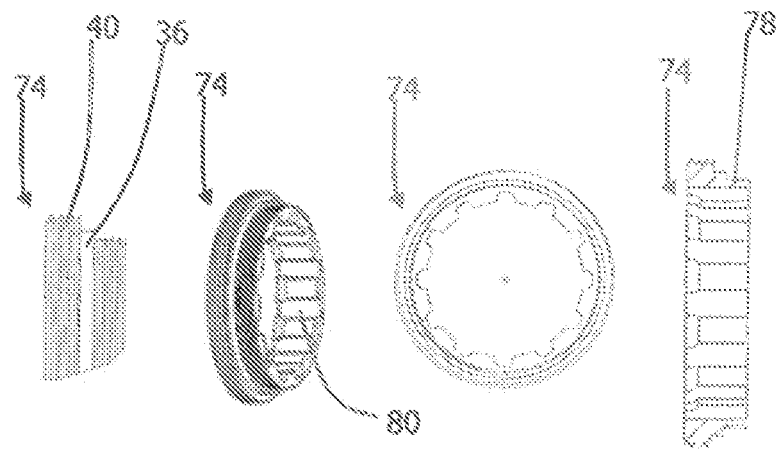
Fig. 13a    Fig. 13b    Fig. 13c    Fig. 13d
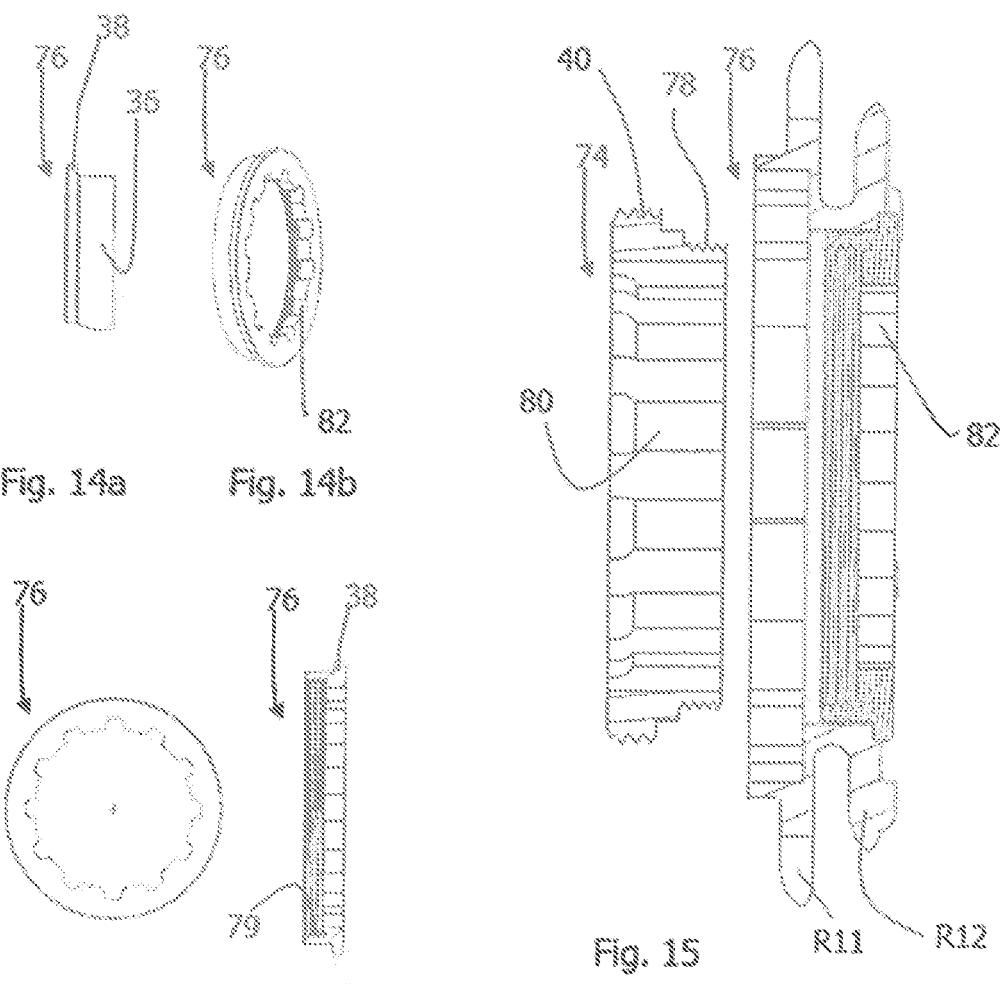
Fig. 14a    Fig. 14b
Fig. 14c    Fig. 14d    Fig. 15

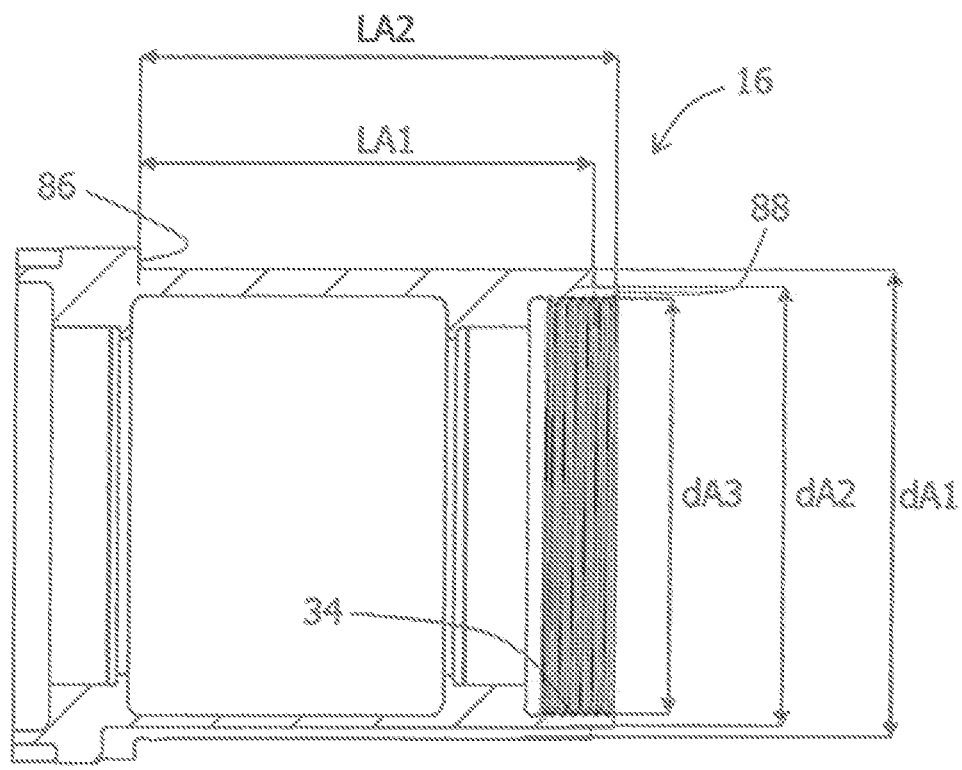
Fig. 18a
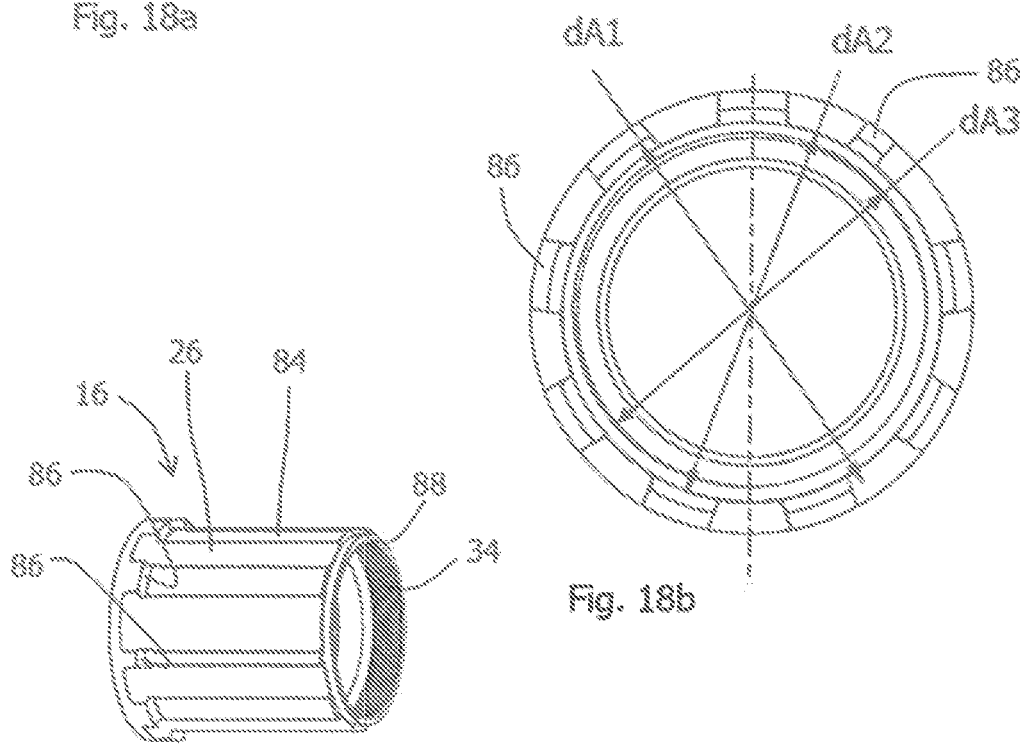
Fig. 18c
Fig. 18b

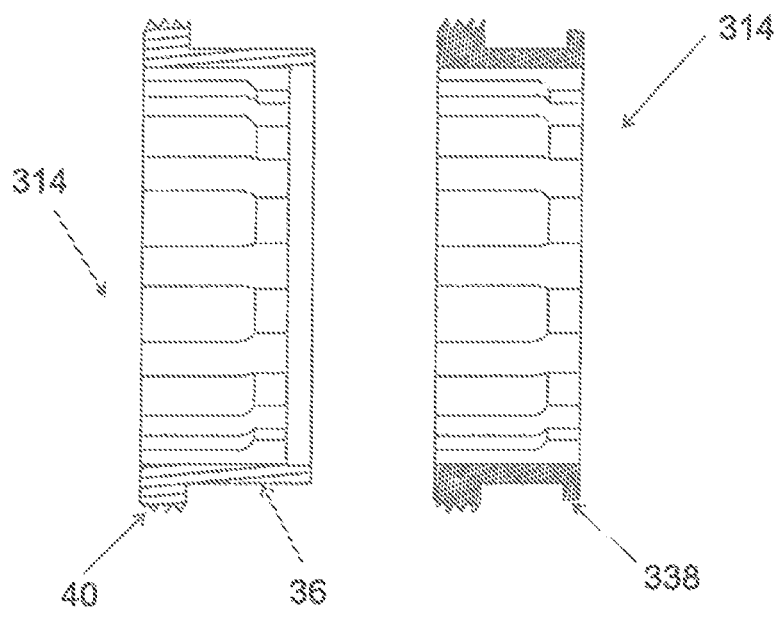

MULTI-SPROCKET ASSEMBLY AND REAR WHEEL ASSEMBLY FOR A BICYCLE WITH A DERAILLEUR SYSTEM

PRIORITY

This application claims priority to, and/or the benefit of, German patent applications DE 10 2020 005 366.1, filed on Sep. 1, 2020, and DE 10 2021 003 431.7 filed on Jul. 2, 2021, the contents of which are included by reference herein in their entirety.

FIELD OF THE DISCLOSURE

The present disclosure relates to a multi-sprocket assembly for a bicycle with a derailleur system, which comprises a multi-sprocket arrangement and a locking screw arrangement. Furthermore, this disclosure relates to a rear wheel assembly for a bicycle with a derailleur system having a multi-sprocket assembly.

BACKGROUND

A rear wheel assembly for a bicycle with a derailleur system typically comprises a multi-sprocket arrangement which is coupled or can be coupled to the rear wheel hub via a driver. Sprockets of the multi-sprocket arrangement are connected to the driver in a torque-transmitting manner. A lock ring is conventionally used to fix the sprockets against axial displacement. Such a lock ring has an external thread at one end region and a radially extending projection at an opposite end region. In the mounted state of the rear wheel assembly, the external thread of the lock ring engages in an internal thread of the driver such that the projection lies against an outer side surface of the smallest sprocket. The lock ring thereby fixes the sprockets of the multi-sprocket arrangement against axial displacement.

The driver is in a torque-transmitting engagement with the rear wheel hub via a freewheeling clutch and permits torque to be transmitted in the one direction of rotation (the driving direction), whereas the driver is rotationally decoupled in the other direction from the rear wheel hub via a freewheeling mechanism. The rear wheel hub, in the mounted state, is connected to a rear wheel axle which is attached at its opposite ends to a respective dropout of a bicycle frame. The bicycle frame thus defines an installation width between its two dropouts and the internal distance therebetween for all components to be fastened to the rear wheel hub, such as a wheel, a driver, a multi-sprocket arrangement, a hub end cap and optionally farther components, for example, for attaching a rear derailleur.

In recent years, derailleur systems in which only a single sprocket is provided in the region of the pedal crank have become more and more popular. This development goes hand in hand with the increased use of motor-assisted bicycles. However, it was initiated by the idea of eliminating a weight-intensive arrangement of a plurality of sprockets with an associated front derailleur. This development has made it necessary to provide a greater transmission ratio range by providing a sufficiently large number of gears on the rear multi-sprocket arrangement (cassette). However, because of the limited and generally standardized installation width, which is available for all components to be fastened to the rear wheel hub, and the predetermined width of commercially available chains, the increasing need for more gears and consequently for more sprockets cannot be easily resolved by adding as many sprockets as desired to the multi-sprocket arrangement. The available construction space (installation width) is up against the width of conventional chains and the corresponding width of the individual sprockets as a limiting factor. In order, nevertheless, to obtain an improved transmission ratio with a limited number of sprockets, there is an effort to increase the transmission range between the largest and the smallest sprocket. It is particularly important for the user in professional cycling or in recreational cycling to have available both as small a gear as possible (largest sprocket) and as large a gear as possible (smallest sprocket) in order, firstly, to be able to comfortably ride up steep slopes and, secondly, to achieve a high speed at the same pedalling frequency. The intermediate sprockets of the multi-sprocket arrangement accordingly have to be coordinated with one another. Large transmission jumps between adjacent sprockets are possible but should generally be avoided.

In conventional solutions, the geometry of the driver imposes limits on the endeavour to provide small sprockets for as large a gear as possible. The sprockets are conventionally fastened to the radial outer circumference of the driver, as a result of which a minimum inner diameter (root circle) of the sprockets is already predetermined by the outer diameter of the driver. When using drivers widely available on the market, the geometry of the driver means that it is still only possible to attach a smallest sprocket with eleven teeth to the sprocket arrangement and, fixed against axial displacement by the lock ring.

There is nevertheless a need in cycling for very small sprockets, i.e. sprockets with ten or fewer teeth. In order to meet this demand, there are approaches in the prior art to use a new driver which differs from the standard driver and, by suitable structural measures, permits the attachment of a sprocket with a number of teeth less than eleven. However, such special solutions are more costly in comparison to standard solutions because of the lower manufacture numbers and, in addition, are generally incompatible with already conventional components of a rear wheel assembly and the commercially available drivers. Furthermore, such special solutions can be difficult to place on the market.

Such a driver designed especially for receiving smaller sprockets is known from document EP 1 342 657 B1. The driver has a first tubular element which can be fastened to the bicycle hub with a freewheeling mechanism. A second tubular element with a smaller diameter can be coupled to the axially outer end of the first tubular element. The second tubular element has an outer diameter which is smaller than that of the first tubular element and which enables a sprocket with ten teeth to be fastened and radially supported thereon. In one embodiment, the reception and the radial support of three sprockets on the second tubular element are shown. To axially fix the sprockets coupled to the driver, a lock ring which is provided with an internal thread engages in an external thread of the second tubular element in such a manner that the lock ring lies against an outer side surface of the smallest sprocket.

A further possibility for using two sprockets with an inner diameter which is smaller than an outer diameter of the driver is shown in laid-open application DE 10 2017 004 853 A1. The two sprockets with the smaller diameter are connected to one another via a first connecting portion and via a further connecting portion to a smallest sprocket which is arranged on the driver. In one exemplary embodiment, the two sprockets with the smaller inner diameter are formed in a self-supporting manner. A locking element is provided which fixes the sprockets against axial displacement. The locking element comprises an external thread which can be brought into engagement with an internal thread of the driver, a shaft portion on which the two sprockets with the smaller diameter are received, and a radially extending projection. The locking element is adapted to receiving sprockets which are smaller in diameter by the outer diameter of the shaft portion being larger than a nominal diameter of the external thread and the projection extending radially outwards to an extent such that it lies against the smallest sprocket and can absorb axial forces exerted by it.

The disclosure is based on the object of providing a multi-sprocket assembly and a rear wheel assembly which provides an improved transmission ratio in a simple manner and can also be coupled to a conventional type of driver.

SUMMARY

According to an embodiment, a multi-sprocket assembly for a rear wheel assembly for a bicycle with a derailleur system comprises a multi-sprocket arrangement and a locking screw arrangement. The multi-sprocket arrangement is designed for torque-transmitting coupling with a driver of the rear wheel assembly and comprises at least eleven sprockets with differing numbers of teeth. The multi-sprocket assembly is designed in such a manner that, in the mounted state of the driver with the multi-sprocket assembly, at least two of the smallest sprockets are axially fixed to the driver via the locking screw arrangement. The locking screw arrangement has a shaft portion for receiving at least one of the at least two smallest sprockets. The shaft portion at its one end region is provided with an axially outer stop portion. Furthermore, the shaft portion at its opposite end region is assigned at least one external thread with which the locking screw arrangement is screwable into an associated internal thread for fixing the locking screw arrangement. The solution according to this disclosure provides that the external thread assigned to the shaft portion has an outer diameter which is larger than the outer diameter of the shaft portion in that region in which the at least one of the at least two smallest sprockets is received.

BRIEF DESCRIPTION OF THE DRAWINGS

Embodiments of the disclosure will be explained in more detail below with reference to the attached schematic drawings, in which:

FIGS. 2a-b show a respective sectional view of a rear wheel assembly according to one embodiment, which is fastened to a rear wheel hub attached between two frame portions;

FIGS. 13a-d, 14a-d, and 15 show a first component and a second component of a two-part locking screw arrangement of a multi-sprocket assembly according to a further embodiment;

FIGS. 18a-c; show the driver in a cross-sectional view (FIG. 18a), in a front view (FIG. 18b) and in a perspective view (FIG. 18c);

FIGS. 21a-b show views according to a further embodiment with a deformed locking screw arrangement.

DETAILED DESCRIPTION

Figure 1:
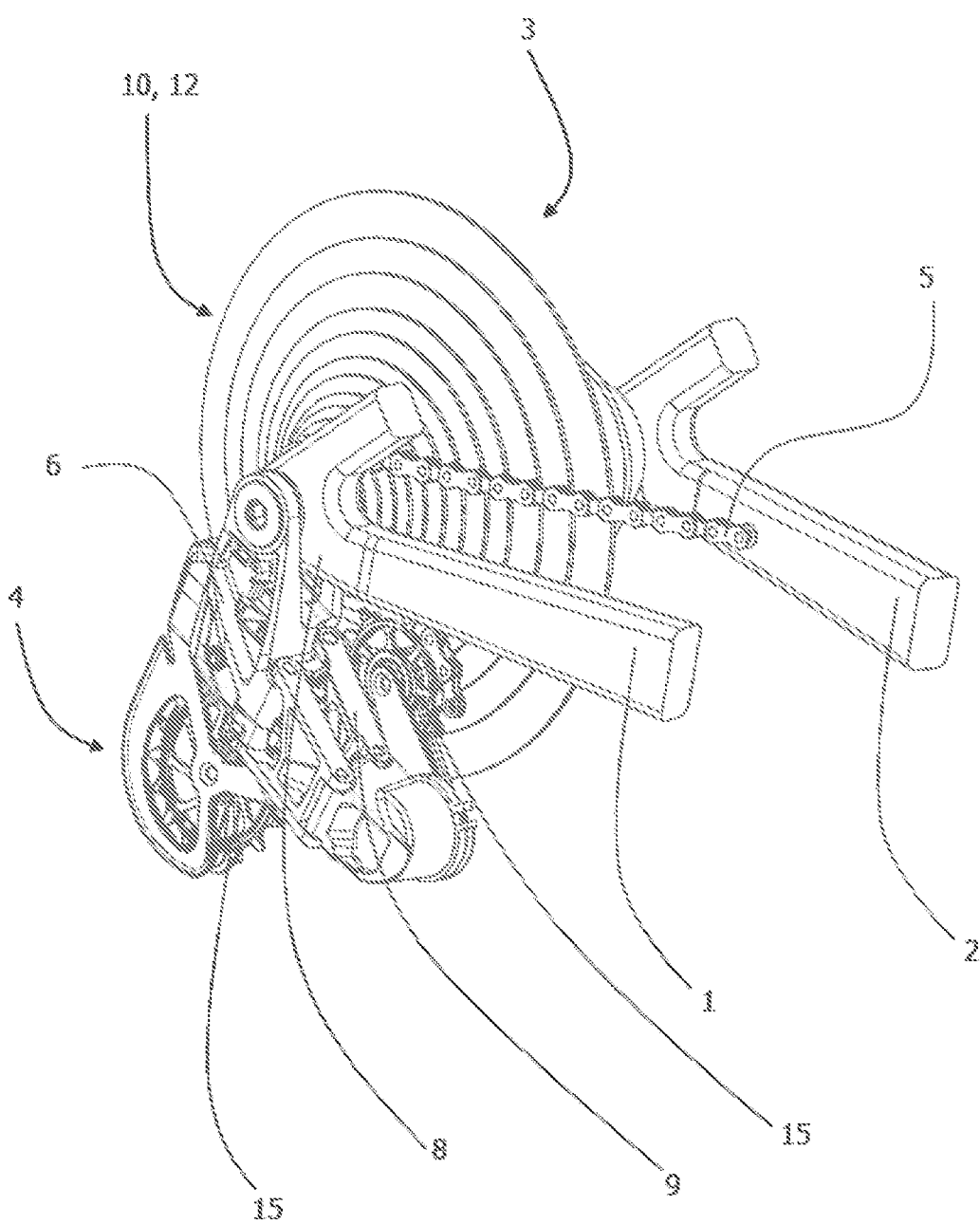
FIG. 1 shows a perspective view of a rear wheel assembly, arranged between two frame portions, according to one embodiment and of a rear gear shift mechanism arranged on one of the frame portions.

One solution according to this disclosure provides that at least two of the smallest sprockets, i.e. at least two of the sprockets with the smallest numbers of teeth, to be axially fixed or fixable to the remaining sprockets of the multi-sprocket arrangement by a locking screw arrangement. As a result, the multi-sprocket arrangement can comprise more sprockets in comparison to a conventional fastening of the sprockets to an outer circumferential surface of the driver. Furthermore, this solution provides a possibility of overcoming the limiting of the inner diameter of the smallest sprockets, which is caused by the outer circumference of the driver, at least for the at least one sprocket which is received on the shaft portion of the locking screw arrangement. In this connection, it is provided that the shaft portion has a smaller outer diameter than the outer diameter of the driver. To fix the locking screw arrangement to a driver or a multi-sprocket arrangement, use is made of the external thread which is assigned to the shaft portion and can engage in an internal thread of the driver and is preferably designed as a ring element. The external thread assigned to the shaft portion thus serves as a link between the shaft portion and the internal thread of the driver. Consequently, the internal thread of the driver can be used to fix the locking screw arrangement to the driver. This solution thus enables a greater transmission ratio of the derailleur system to be achieved.

In one aspect of the disclosure, at least one of the at least two smallest sprockets which is received on the shaft portion can be formed in a self-supporting manner. That is to say, there could be a radial distance between the shaft portion and the at least one sprocket received thereon or all the sprockets received thereon.

When a smallest sprocket is mentioned in this application, this refers to the sprocket which has the smallest number of teeth. If a plurality of smallest sprockets is discussed, the adjacent sprockets with the smallest numbers of teeth are thus meant. In one embodiment, a smallest sprocket has, for example, ten teeth. However, smallest sprockets with nine or eight teeth are also possible. The smaller the number of teeth, the greater the transmission ratio of the derailleur system can be which can be achieved with the multi-sprocket arrangement with an unchanged largest sprocket. The minimum number of teeth is limited by the minimum possible inner diameter of the smallest sprocket in conjunction with the bicycle chain which is used. The multi-sprocket assembly can comprise a multi-sprocket arrangement with twelve sprockets or even thirteen sprockets or more. The largest sprocket can have at least 58, in particular 50, 51 or 52 teeth.

The axially outer stop portion can be configured to absorb forces which act axially outwards on the locking screw arrangement. The direction axially outwards is defined as starting from a bicycle center plane, which runs orthogonally to the axis of rotation of the multi-sprocket arrangement and through a center point between two opposite frame dropouts of a bicycle frame, to the frame dropout which is closer to the multi-sprocket arrangement. The direction axially inwards is opposed to the direction axially outwards. A direction radially outwards runs orthogonally to an axis of rotation of the multi-sprocket arrangement and away from the axis of rotation. The direction radially inwards is opposed to the direction radially outwards.

The internal thread, in which the external thread assigned to the shaft portion can engage for fixing the locking screw arrangement, can be arranged on the driver. In an alternative embodiment, this internal thread can be arranged on a radially inner region of the multi-sprocket arrangement. The intermeshing threads are configured in such a manner that there can be a sufficient overlap to transfer the forces that occur during operation.

According to an embodiment, at least one sprocket together with a connecting portion assigned to the sprocket is received on the shaft portion. According to an alternative embodiment, two sprockets with a connecting portion connecting the two sprockets can be received on the shaft portion. For this purpose, a length from an inner side surface of the external thread assigned to the shaft portion to an inner side surface of the axially outer stop portion can be between 3.2 mm and 5.0 mm. The connecting portion can be a flange portion or a retaining pin. The connecting portion can be made integral with or attached to the adjacent sprockets.

In general, the axial length of the locking screw arrangement can be smaller than a distance between four or three adjacent sprockets, as measured from an inner side surface of the largest of the four or three sprockets and an outer side surface of the smallest of the four or three sprockets.

According to an embodiment, an outer diameter of the axially outer stop portion is smaller than, equal to or larger than an outer diameter of the external thread assigned to the shaft portion. It goes without saying that a smaller design of the stop portion saves more space but should nevertheless be formed with sufficient stability so as to absorb axial forces occurring during operation. In addition, the outer diameter of the axially outer stop portion can be larger than the outer diameter of the shaft portion. This creates an undercut on the outer circumference of the locking screw arrangement. In connection with the present disclosure, an undercut is understood as meaning that there is a region, the outer circumferential surface of which is bounded by two axial stops with a larger diameter. The formation of an undercut makes it possible to simultaneously provide, for the locking screw arrangement, an external thread of a sufficiently large size, a shaft region with a smaller diameter than the outer diameter of the driver, and axial fixation of sprockets received on the shaft portion in a very space-saving design.

According to an embodiment, the external thread assigned to the shaft portion is formed integrally on the shaft portion or manufactured integrally therewith. The axially outer stop portion can likewise be formed integrally on the shaft portion or can be manufactured integrally therewith. At least one of the external thread and the stop portion can be integrally formed during the installation of the multi-sprocket assembly after the at least one of the at least two smallest sprockets has been received in or on the shaft region. The integral formation can take place by means of laser welding, friction welding, soldering, adhesive bonding, pressing, pinning or/and folding. The locking screw arrangement can therefore have at least one joint which is formed, for example, by the above integral forming method. The joint can run orthogonally or parallel to the axis of rotation of the multi-sprocket arrangement. Alternatively, an additive manufacturing method, for example a 3D printing method, is possible.

Alternatively, the axially outer stop portion and/or the external thread assigned to the shaft portion can be produced integrally with the shaft portion and deformed. The deforming increases the diameter of the axially outer stop portion and/or of the external thread relative to the shaft portion. The deformed external thread assigned to the shaft portion and/or the axially outer stop portion have an outer diameter which is larger than the outer diameter of the shaft portion in the region in which the at least two smallest sprockets are received.

For this purpose, in a first step, the axially outer stop portion is produced integrally with the shaft portion and with the same outer diameter. In a second step, the axially outer stop portion and/or the threaded portion is deformed such that the outer diameter thereof is increased, and its the axial length reduced at the same time. The material that is to be deformed is pushed out of the axial direction into the radial direction. The deforming can take place, for example, by means of crimping. The external thread assigned to the shaft portion can also be produced cost-effectively in this manner. After deforming, the enlarged outer diameter of the external thread assigned to the shaft portion only needs to be provided with an external thread in a third step. During the production of the axially outer stop portion and/or of the external thread assigned to the shaft portion, the at least two smallest sprockets are pushed onto the shaft portion before the deformation. After the reshaping or deformation, the at least two smallest sprockets are fixed on the shaft portion in the axial direction by the enlarged outer diameter of the axially outer stop portion and/or of the external thread assigned to the shaft portion. It is advantageous in this embodiment that neither additional parts nor joints are required.

In a further alternative refinement, the axially outer stop portion can be formed by a plurality of snap hooks which are distributed over the outer circumference of the locking screw arrangement, wherein the shaft portion or/and the snap hooks has/have such an elasticity that a sprocket or an arrangement of a plurality of sprockets with an inner diameter smaller than the outer diameter of the snap hooks can be pushed over the snap hooks such that the sprocket or arrangement of a plurality of sprockets is received in the region of the shaft portion. When snap hooks are used, the locking screw arrangement can already be integrally formed before the installation of the multi-sprocket assembly. This simplifies the method of installing the multi-sprocket assembly.

In a further alternative embodiment, the axially outer stop portion is detachable from the shaft portion and is designed in the form of a securing element which can be connected to the shaft portion, for example engages in a groove formed in the end region of the shaft portion. The securing element can be a ring element, for example a snap ring. During the installation of the multi-sprocket assembly, all sprockets of the multi-sprocket arrangement can first be received in the region of the shaft portion and then the securing element can be inserted into the groove in order to axially fix the multi-sprocket arrangement.

Alternatively, the larger diameter threaded portion and/or stop portion of the locking screw arrangement can be designed in a segmented manner. The segmented design of the locking screw arrangement and at least the smallest sprocket permits a bayonet-like connection between the smallest sprockets and the locking screw arrangement. The two parts are connected to each other by plugging one inside the other and rotating with respect to each other.

A combination of the abovementioned configurations of the axially outer stop portion and of the external thread assigned to the shaft portion is also conceivable, for example the one axial end of the locking screw arrangement could be produced by an integral forming method and the other axial end by deformation. It is equally possible for the embodiments already mentioned to be combined with the following embodiments, such as, for example, with the two-part locking screw arrangements. However, in all combinations the outer diameter of the external thread assigned to the shaft portion should be larger than the outer diameter of the shaft portion in that region in which the at least one of the at least two smallest sprockets is received.

A further embodiment relates to a two-part locking screw arrangement which comprises a first component and a second component. The two components can be detachable from one another. In one embodiment, the external thread assigned to the shaft portion can be detachable from the shaft portion. Possible connecting means include screw connections, plug-in connections, latching mechanisms and other releasable or detachable connection means.

In an embodiment, the first component can have a first tool interface and the second component a second tool interface. The tool interfaces can be arranged radially inward on an inner circumferential surface of the first or second component. The two tool interfaces can be identical or differ from one another in order to enable the same or two different tools to engage. In this way, both components can be handled independently of one another by means of the corresponding tool. For example, during the installation, one of the components can be connected to the driver and then the two components can be connected. Alternatively, the two components can first be connected to one another and then both components can be connected together to the driver. It goes without saying that the removal of the components from the driver can take place simultaneously. The tool interfaces advantageously allow a destruction-free installation or removal of the two components on or from the driver in a state in which the non-self-supporting sprockets of the multi-sprocket arrangement are coupled to the driver.

The external thread assigned to the shaft portion can be incorporated by the first component, and the axially outer stop portion can be incorporated by the second component. The first and the second component are, for example, screwable to each other. This two-part locking screw arrangement simplifies the installation of the multi-sprocket assembly since it permits the two components to be connected using a simple mechanical tool.

For example, a cassette tool known from the prior art with an outer diameter larger than 22 mm can engage in the tool interface of the two-part or single-part locking screw arrangement in a torque-transmitting manner.

More precisely, the first component can have a first connecting thread which is configured to engage in a complementary second connecting thread of the second component. The connecting threads can be arranged at different positions, for example between the shaft portion and the external thread assigned to it, or in the region of the shaft portion, or between the shaft portion and the stop portion. The connecting thread of the first component can be an external thread and the complementary connecting thread of the second component can be an internal thread. Alternatively, the first connecting thread of the first component can be an internal thread and the complementary second connecting thread of the second component can be an external thread.

Regardless of whether the locking screw arrangement is formed integrally or in two parts, it is designed to engage in an internal thread by an external thread assigned to the shaft portion. The internal thread can be arranged on the driver, on the outer circumferential surface of which sprockets of the multi-sprocket arrangement are arranged. When the locking screw arrangement engages in or is screwed into the driver, the at least one sprocket received on the locking screw arrangement has any desired angular position relative to sprockets arranged on the outer circumferential surface of the multi-sprocket arrangement. Particularly in the case of high-priced bicycle gears, however, a predetermined angular positioning of the tooth formations on the sprockets to each other in the assembled state is desirable in order to ensure gear shift operations of the bicycle chain between the individual sprockets in a smooth-running manner and so as to be scarcely noticeable by the cyclist, and, consequently, as continuous a transmission of torque as possible.

In general, threaded connections do not allow an exact angular positioning of the screwed-together elements to one another, especially not in the case of products manufactured in large numbers. In addition, in bicycle technology, the components are sometimes released from one another for maintenance or for repair purposes, which further complicates an exact angular repositioning of the individual threaded connections with respect to one another after they have been reassembled. In the case of the threaded connection of the locking screw arrangement to the driver, it is therefore provided, according to an embodiment that the angular position of the smallest sprocket or of the two smallest sprockets received on the shaft portion is adjustable independently of the threaded position. This means that the smallest or the two smallest sprockets can be rotatable relative to the shaft portion of the locking screw arrangement. For example, the angular position of the smallest sprocket, preferably of the at least two smallest sprockets, relative to sprockets coupled directly to the driver can be secured by suitable securing means before, during or after the screwing of the locking screw arrangement into the driver. The securing means can, for example, couple the sprockets received by the locking screw arrangement in a rotationally fixed manner with further sprockets of the multi-sprocket assembly. For example, the smallest sprocket, which is coupled to the driver and the adjacent, next smallest sprocket received by the locking screw arrangement can each have a collar with teeth and notches which can intermesh and can secure a desired angular position of the sprockets with respect to one another.

In order to ensure the relative movement of the at least one sprocket received on the shaft portion, in one embodiment, the outer diameter of the external thread assigned to the shaft portion is larger than an inner diameter of the smallest sprocket of the multi-sprocket arrangement. The shaft portion can be configured to receive one or two sprockets which have an inner diameter of 27.0 mm to 28.2 mm, preferably of 27.2+/−0.2 mm. Alternatively, the shaft portion can be configured to receive a sprocket which has an inner diameter of approximately 24 mm. Furthermore, the shaft portion can comprise a step, and therefore the shaft portion is suitable for receiving two sprockets which have the indicated larger or smaller inner diameter. Sprockets with the indicated inner diameters are suitable for having ten or nine teeth at a distance suitable for engaging in the bicycle chain.

In the mounted state, the two smallest sprockets of the multi-sprocket arrangement can be integrally connected to one another. This defines the angular positioning of the two smallest sprockets with respect to each other. The integral connection can be made by forming the two smallest sprockets in one piece or by integrally forming the sprockets on each other, for which purpose the integral forming methods discussed above can be used. Alternatively, an additive manufacturing method, for example a 3D printing method, is possible. The connecting portion is preferably arranged between the sprockets. Joints that arise during the integral forming can run parallel or orthogonally to the axis of rotation of the multi-sprocket arrangement and can be arranged adjacent to the connecting portion connecting the two sprockets. In one embodiment, the three smallest sprockets of the multi-sprocket arrangement can also be connected integrally to one another in the mounted state. Joints can be provided in the region of the shaft portion, between the shaft portion and the associated external thread or/and between the shaft portion and the axially outer stop portion.

In an alternative embodiment of the multi-sprocket arrangement, the two or three smallest sprockets of the multi-sprocket arrangement can be detachably connected to one another and can have intermeshing teeth and associated notches. In a state in which the teeth are in engagement with the associated notches, the sprockets are connected to one another in a rotationally fixed manner. The sprockets which are detachably connected to one another are fixed axially, for example, by the locking screw arrangement being connected to the driver in the mounted state.

In order to install the locking screw arrangement on, for example, a driver, the locking screw arrangement can have a radially inner tool interface which permits a torque-transmitting engagement of a tool. An inner diameter of the tool interface can be between 22.6 mm and 23.6 mm, preferably 21.6+0.4/−0.6 mm.

In order to provide the multi-sprocket assembly having a small axial length, the smallest sprocket of the multi-sprocket arrangement can have, on its axially outer end side, a radial and axial recess which is designed in such a manner that the axially outer stop portion can engage therein. If, in the mounted state of the multi-sprocket assembly, the axially outer stop portion and the radial and axial recess are in engagement with each other, the outer side surface of the smallest sprocket can lie axially further on the outside than an end side of the axially outer stop portion. Alternatively, the outer side surface of the smallest sprocket can be aligned with the end side of the axially outer stop portion. According to a further alternative, the axially outer stop portion can protrude axially outwards from the outer side surface of the smallest sprocket by less than a maximum of 0.5 mm, preferably less than 0.2 mm, it goes without saying that the statements above are equally applicable to all the embodiments of the axially outer stop portion.

In one embodiment, an intermediate element, for example a sheet-metal ring or a plastic ring, can be inserted in the region of the recess between the smallest sprocket and the locking screw arrangement in order to reduce the friction occurring at contact points. In a further embodiment, the locking screw arrangement can be formed as one piece and can be provided as a 3D printed component with the at least one sprocket received on the shaft portion. The locking screw arrangement can thereby be produced integrally and the sprockets can be printed radially outside the locking screw arrangement in such a manner that they are received in the region of the shaft portion. That is to say, the locking screw arrangement and the sprockets received thereon can be produced integrally. It goes without saying that further sprockets of the multi-sprocket arrangement can also be produced as a 3D printed component.

According to a further aspect, a rear wheel assembly for a bicycle with a derailleur system comprises a rear wheel hub which can be arranged between two opposite frame portions of a bicycle frame, a driver which is coupled rotatably to the rear wheel hub, and a multi-sprocket assembly which is designed according with the foregoing. The multi-sprocket arrangement of the multi-sprocket assembly is non-rotatably coupled or couplable to the driver.

The driver to which the multi-sprocket assembly is coupled or can be coupled can be a standard driver known in the art and is sold on the market under the name Hyperglide® driver or HG driver for short. The multi-sprocket assembly can therefore be used together with a conventional type of driver, which is cheap and quickly available due to its large production numbers and its widespread use.

Possible configurations of the driver are set forth below. The driver can have, on a first driver region of its radial outer surface, a driver profile which is arranged axially outwards from the driver stop along a first axial driver length. The first axial driver length can be smaller than a second axial driver length which extends from the driver stop as far as the axially outer end side of the driver. The driver can be free from driver profiles on a second driver region of its radial outer surface, the driver region being adjacent to the axially outer end side of the driver. Furthermore, the driver can have an opening which extends radially outwards from a central axis of the driver and axially inward from the axially outer end side of the driver, wherein the opening can have the internal thread on its radial inner surface.

Characteristic dimensions of the driver can be as follows. The first axial driver length of the driver from the driver stop as far as the end of the driver profiles can be greater than 32.9 mm and is preferably 33.2+/−0.4 mm. The second axial driver length of the driver from the driver stop as far as the axially outer end side of the driver can be greater than 34.2 mm and is preferably 34.9+/−0.3 min. A first driver outer diameter of the driver in the first driver region along the first axial driver length of the driver can be greater than 34.2 mm and is preferably 34.5+/−0.2 mm. A second driver outer diameter of the driver in the second driver region which is adjacent to the axially outer end side of the driver can be greater than 31.4 mm and is preferably 32.1+0.4/−0.2 mm. A first driver nominal diameter of the driver axially adjacent to its axially outer end side can be greater than 29.8 mm and is preferably 30.6+/−0.2 mm.

Furthermore, the multi-sprocket assembly can be designed in such a manner that, in the mounted state, a first distance in the axial direction from the driver stop as far as the outer side surface of the smallest sprocket is greater than 38.0 mm, preferably greater than 39.1 mm, even more preferably 39.9+/−0.2 mm. Additionally or alternatively, a second distance in the axial direction from the axially outer end side of the driver to an outer side surface of the smallest sprocket can be greater than 4.0 mm and is preferably 5.0+/−0.2 mm.

With the locking screw arrangement according to the disclosure, the installation width available for the installation of the multi-sprocket assembly can be particularly advantageously used in conjunction with the use of a multi-sprocket arrangement having as large a number of teeth as possible. This advantageous use of space is reflected in the first and second space utilization factors defined below, which relate the dimensions of the driver to those dimensions that result from the locking screw arrangement attached to the driver and the at least one sprocket held on it. The available installation width for all the components to be attached to the rear wheel hub is at least 142 mm. The installation width is the distance from an outer side of a left hub end cap adjacent to the frame portion to an outer side of the right hub end cap adjacent to the frame portion.

The first space utilization factor, which is results from the ratio of the second driver length and the second distance, can be in a range of between 5 and 10. The second space utilization factor, which is results from the ratio of the first driver length and the second distance, can be in a range of between 5 and 10.

The disclosure also relates to a method for assembling a rear wheel assembly. Such a method for the assembling of a rear wheel assembly may comprise the following steps: the step of connecting at least two sprockets with the smallest numbers of teeth of a multi-sprocket arrangement to one another, the step of connecting the at least two connected sprockets with a locking screw arrangement such that the at least two sprockets are mounted rotatably about a center axis of the locking screw arrangement, the step of fastening the locking screw arrangement to a driver by an external thread of the locking screw arrangement engaging in an internal thread of the driver, the step of aligning the two connected sprockets in relation to sprockets with greater numbers of teeth which are connected to a driver, and the step of fixing the two aligned and connected sprockets by fastening means to a sprocket connected to the driver.

All of the features of the multi-sprocket assembly and of the rear wheel assembly of the above-explained aspects of the disclosure and embodiments can be combined with one another.

FIG. 1 shows a perspective view of a rear wheel assembly 3 arranged between two frame portions 1, 2 and a rear gear shift mechanism 4 arranged on one of the frame portions 1 in engagement with a bicycle chain 5. A b-knuckle 6 for fixing the rear gear shift mechanism 4 engages around a frame dropout 8 of the frame portion 1 and is fixed on the frame dropout by a plug-in axle 7 which is received in said frame dropout 6 and a frame dropout of the other frame portion 2. A p-knuckle 9 is attached pivotably to the b-knuckle 6, wherein pivoting of the p-knuckle 9 changes at least the axial position thereof in relation to the b-knuckle 6.

The rear wheel assembly 3 comprises a multi-sprocket assembly 10, which in turn comprises a multi-sprocket arrangement 12 and a locking screw arrangement 14. For the sake of clarity, the sprockets of the multi-sprocket arrangement 12 are merely illustrated schematically in FIG. 1 by making the respective outer circumferences of the sprockets clear In the illustration of FIG. 1, the bicycle chain 5 which is driven by a front driving sprocket (not illustrated) is in engagement with a sprocket of the multi-sprocket arrangement 12 and with two chain pulleys 15 of the rear gear shift mechanism 4. It goes without saying that pivoting of the rear gear shift mechanism 4, in particular the p-knuckle 9, changes the position of the bicycle chain 5 in relation to the sprockets, and therefore the bicycle chain 5 can engage in an adjacent next or next but one sprocket.

FIGS. 2a-b show the multi-sprocket assembly 10 which comprises the multi-sprocket arrangement 12 and the locking screw arrangement 14. The multi-sprocket assembly 10 is connected to a driver 16 and forms the rear wheel assembly 3 therewith. The rear wheel assembly 3 is arranged on a rear wheel hub 11 which runs between the two opposite frame portions 1, 2 and is fastened or fastenable to the frame portions 1, 2 by a rear wheel axle 7. A derailleur hanger 22 which serves for the installation of the rear gear shift mechanism 4 and through which the rear wheel hub 11 runs is arranged between the frame portion 1 and the rear wheel assembly 3.

The multi-sprocket arrangement 12 is illustrated with twelve sprockets R1-R12. FIG. 2a shows a multi-sprocket arrangement 12 in which the four largest sprockets R1-R4 are connected to a spider 13, and therefore the torque is transmitted to the driver 16 via the spider 13. In this space-saving embodiment, the four largest sprockets are spaced apart radially from the driver 16. The six middle sprockets R4-R9 are in each case spaced apart axially from one another with spacers 17 and engage directly in a torque-transmitting manner with the driver 16. The two smallest sprockets R11, R12 are connected to the locking screw arrangement 14 in a torque-transmitting manner via the third smallest sprocket R10.

FIG. 2b shows an alternative multi-sprocket arrangement 12 in which the sprockets are connected to one another by pins 19. Only the largest sprocket R1 is connected to the driver 16 in a torque-transmitting manner, i.e. reaches radially as far as the driver 16. The remaining sprockets R2-R12 are spaced apart radially from the driver 16. The three smallest sprockets are formed integrally, for example are welded, and are connected to the driver 16 in a torque-transmitting manner via the third smallest sprocket R10, and are fixed axially via the locking screw arrangement 14.

FIGS. 2a-b also show the installation width D0 which is available for the components to be fastened to the rear wheel hub 11 and is at least 142 mm. The installation width is the distance from an outer side, adjacent to the frame portion 2, of a left hub end cap 23 to an outer side, adjacent to the frame portion 1, of the right hub end cap 25.

In the two alternative embodiments of the multi-sprocket arrangement, the third smallest sprocket R10 is arranged on an outer circumferential surface 24 of the driver 16 and is supported radially on the driver 16. In addition, the third smallest sprocket R10 engages in a driver profile 26 arranged on the outer circumferential surface 24 of the driver 16, as a result of which the third smallest sprocket R10 is non-rotatably coupled to the driver 16. The two smallest sprockets R11, R12 are at least partially arranged axially outside the driver 16 and adjacent to the third smallest sprocket R10. An enlarged view of the three smallest sprockets R10-R12 which are attached to the driver 16 and are fixed axially by the locking screw arrangement 14 is illustrated in FIG. 3.

Figure 3:
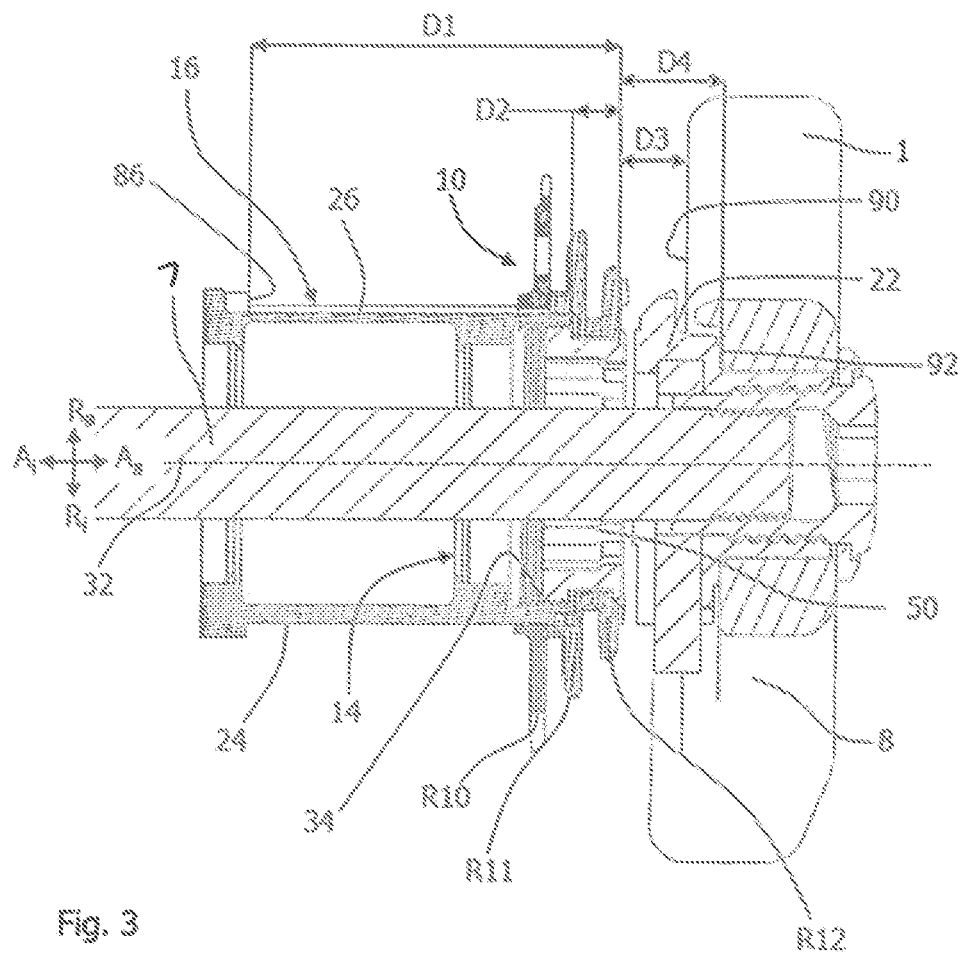
FIG. 3 shows a sectional view through a rear wheel assembly fastened to a frame, the sectional view showing a detail of the multi-sprocket assembly from FIGS. 2a-b in enlarged form.
Figures 4A, 4B:
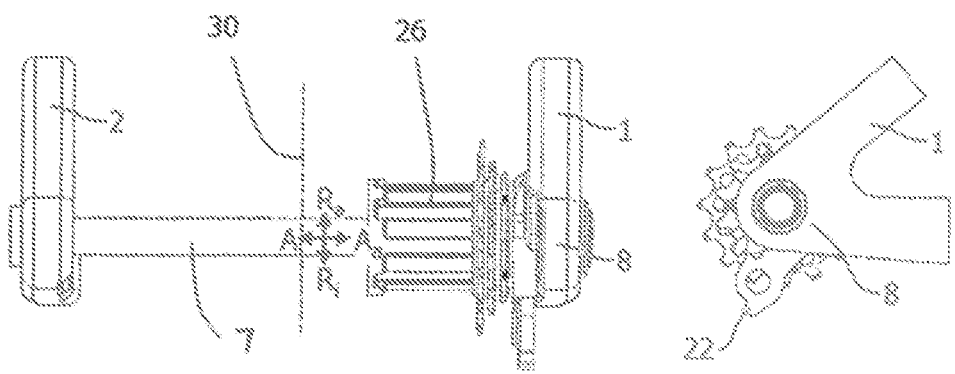
FIGS. 4a-b show the rear wheel assembly of FIG. 3 in a rear view (FIG. 4a) and a side view (FIG. 4b)

Axial direction details used in this application relate to the bicycle center plane 30 and to the frame portions 1, 2, as is apparent in FIG. 4a. A direction axially inwards $A_i$ is defined as the direction from one of the frame portions 1, 2 towards the bicycle center plane 30, whereas a direction axially outwards $A_a$ is defined as the direction from the bicycle center plane towards the frame portion 1. The axial directions $R_i$ and $R_a$ are consequently opposed to each other. If, by contrast, a direction radially outwards $R_a$ is mentioned, this is a direction which runs orthogonally to an axis of rotation 32 of the multi-sprocket arrangement 12 and points away from the latter. A direction radially inwards $R_i$ is opposed to the direction radially outwards $R_a$ and is a direction towards the axis of rotation 32 of the multi-sprocket arrangement 12. The axis of rotation 32 of the multi-sprocket arrangement 3 runs parallel to the rear wheel hub and coincides with an axis of rotation or longitudinal axis of the rear wheel huh. The discussed direction details are illustrated in FIG. 3.

The rear wheel assembly 3 which is illustrated in FIG. 3 and is arranged on the frame portion 1 is illustrated as a rear view in FIG. 4a and as a side view in FIG. 4b. As can best be seen in FIG. 4b, the rear wheel assembly 3 is attached to a frame dropout 8 of the frame portion 1 of the bicycle frame.

The driver 16 has, on its axially outer side in the mounted state, an opening in which an internal thread 34 is arranged. The locking screw arrangement 14 can engage in the internal thread 34.

Figure 5:
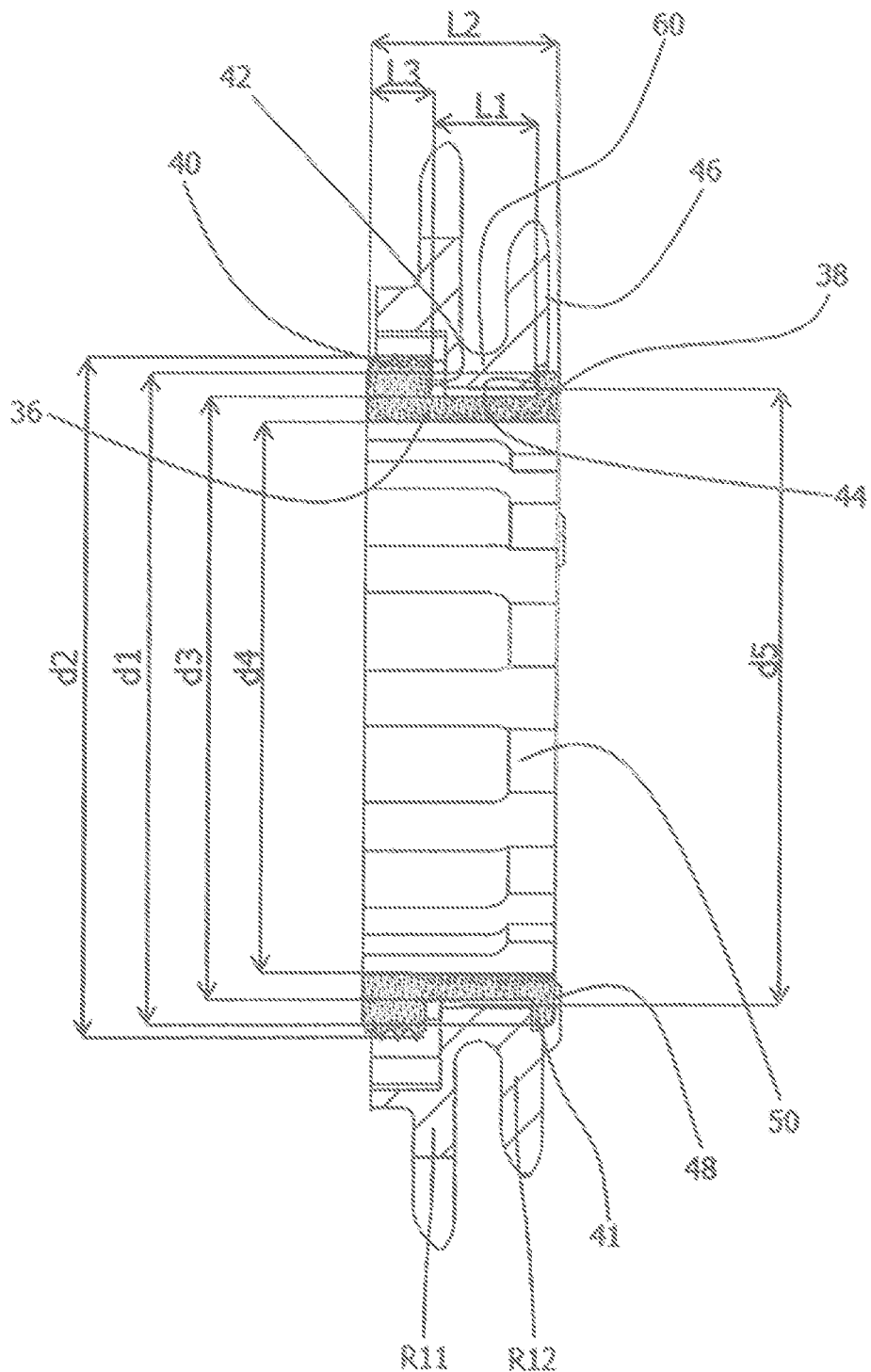
FIG. 5 shows a cross section of a locking screw arrangement of the multi-sprocket assembly of FIG. with sprockets arranged thereon.

A detailed view of the locking screw arrangement 14 according to one embodiment with at least two smallest sprockets R11, R12 received thereon is illustrated in FIG. 5. The at least two smallest sprockets R11, R12 are received on a shaft portion 36. The shaft portion 36 is provided on its one end region with an axially outer stop portion 38. An external thread 40 assigned to the shaft portion is arranged on the opposite end region of the shaft portion 36. The external thread 40 of the locking screw arrangement can engage in the internal thread 34 of the driver 16. The external thread 40 then serves as a diameter-imparting ring element between the driver 16 and the shaft portion 36. In the mounted state of the rear wheel assembly 3, the external thread 40 is therefore arranged axially within the internal thread 34 of the driver 16 and adjacent to the shaft portion 36 of the locking screw arrangement 14. The outer diameter d1 of the stop portion 38 and the outer diameter d2 of the external thread 40 are larger than an outer diameter d3 of the shaft portion 36 in the region which is provided for receiving the at least one of the at least two smallest sprockets R11, R12. This results in a locking screw arrangement 14 with an undercut.

The outer diameter d2 of the external thread 40 assigned to the shaft portion can be between 30.1 mm and 30.6 mm, preferably 30.5+/−0.2 mm. The outer diameter d3 of the shaft portion 36 in the region in which the at least one of the at least two smallest sprockets R11, R12 is received can be between 26.0 mm and 27.5 mm, preferably 26.8+/−0.2 mm or, alternatively, approximately 24 mm. In an embodiment which is not illustrated, the shaft portion can comprise a step, and therefore the shaft portion has a respective region with the indicated alternative inner diameters.

The undercut between an inner side surface 42 of the external thread 40 assigned to the shaft portion and an inner side surface 44 of the stop portion 38 has an axial length L1 between 3.2 mm and 5.0 mm. An axial length L2 of the locking screw arrangement 14 is, for example, between 7.5 mm and 10.3 mm, preferably 9.0+/−0.2 mm. In order to ensure that there is sufficient axial pretensioning on the multi-sprocket arrangement in order to transmit loads, an axial length L3 of the external thread 40 assigned to the shaft portion can be between 2.5 mm and 3.5 mm, preferably 3.0+/−0.2 mm.

In the exemplary embodiment illustrated in FIG. 5, the shaft portion 36 receives the two smallest sprockets R11, R12 of the multi-sprocket arrangement 12. The at least two smallest sprockets R11, R12 are formed in a radially self-supporting manner, i.e. there is a distance between the shaft portion 36 and the two smallest sprockets R11, R12 in the radial direction. The radially self-supporting design of the at least two smallest sprockets R11, R12 is achieved by said sprockets being connected to one another and to an adjacent larger sprocket R10, for example by a joining method or by a latching mechanism. For example, the smallest sprocket R10 which is coupled to the driver and the adjacent, next smaller sprocket R11 received on the locking screw arrangement in each case have a collar with teeth and notches which can intermesh and define a desired angular position of the sprockets with respect to one another.

The smallest sprocket R12 lies with an axially outer region against the stop portion 38 such that, in the mounted state of the rear wheel assembly 3, the multi-sprocket arrangement 12 is fixed axially. For a particularly space-saving embodiment, the smallest sprocket R12 has a recess 41 radially inwards and axially outwards, in which the stop portion 38 engages. The engagement can be, for example, in such a manner that the stop portion 38 is at least partially received in the recess 41, as illustrated in FIG. 5. In an alternative embodiment, an outer side surface 46 of the smallest sprocket R12 can coincide with an end surface 48 of the stop portion 38.

For the installation of the rear wheel assembly 3, the locking screw arrangement 14 is screwed with its external thread 40 into the internal thread 34 of the driver 16. The rotary force necessary for this purpose can be transmitted to the locking screw arrangement 14 with the aid of a tool. For this purpose, the locking screw arrangement 14 has a tool interface 50 on an inner circumferential surface, in which the tool can engage in a torque-transmitting manner.

The inner circumferential surface of the locking screw arrangement 14 can determine an inner diameter d4 of the shaft portion 36, which inner diameter is between 23.8 mm and 25.0 mm, preferably 24.0+/−0.2 mm. The inner diameter d5 of the smallest sprocket R12 received on the locking screw arrangement 14 is larger than the outer diameter d3 of the shaft portion 36, and therefore the locking screw arrangement 14 can rotate relative to the sprockets received thereon.

Figure 6:
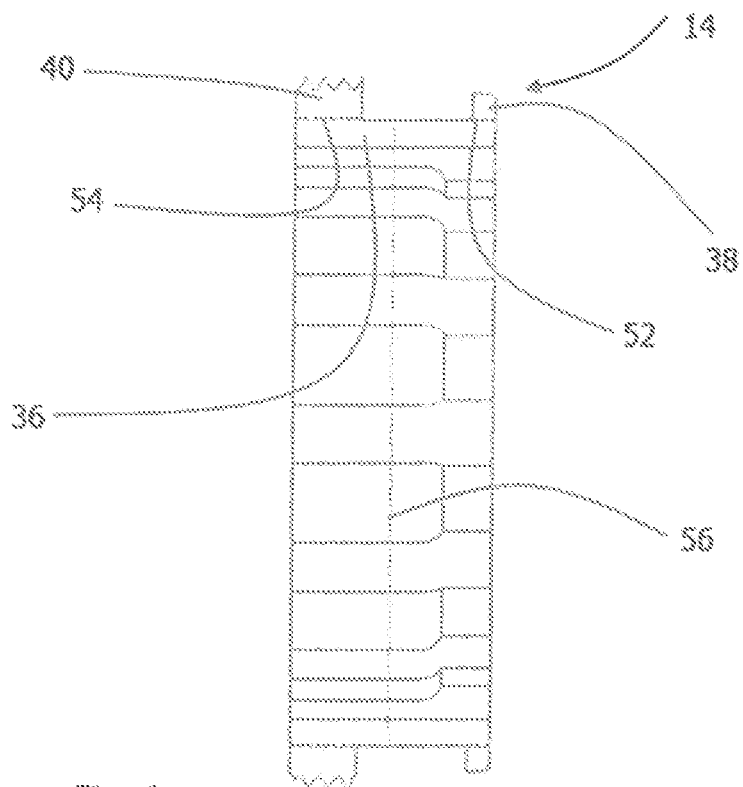
FIG. 6 shows a sectional view through the locking screw arrangement of the multi-sprocket assembly of FIG. 3 with clarification of joints according to one embodiment.
Figures 7A, 7B, 7C, 7D, 7E:
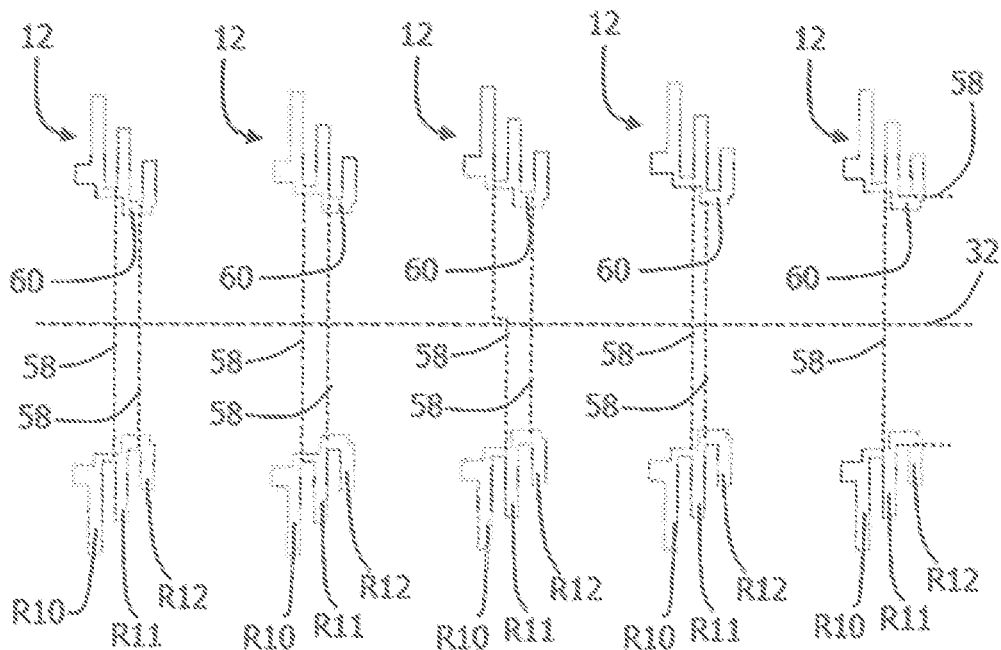
FIGS. 7a-e show sectional views through the multi-sprocket arrangement of FIG. 3 with respective clarification of joints.

In order to receive at least one of the two smallest sprockets R11, R12 in the region of the undercut of the locking screw arrangement 14, the latter, according to one embodiment, is provided with joints. Possible joints 52, 54, 56 of the locking screw arrangement 14 are illustrated in FIG. 6. The joints are located between the shaft portion 36 and the axially outer stop portion 38, in the region between the shaft portion 36 and the associated external thread 40, or/and in the region of the shaft portion 36. The locking screw arrangement 14 has at least one of the joints 52, 54, 56. During the installation of the multi-sprocket assembly 10, the sprockets R11, R12 can be received in the region of the shaft portion 36 before the locking screw arrangement 14 is joined at at least one of the joints 52, 54, 56.

In one embodiment, the sprockets R10, R11, R12 can be connected to one another by joints 58. FIGS. 7a-e show possible joints 58 between the three smallest sprockets R10, R11, R12. The joints 58 are located adjacent to a connecting portion 60 which is arranged between two adjacent sprockets and defines the distance therebetween. For example, the smallest sprocket R12 is joined at a connecting portion 60 between the smallest and the second smallest sprocket R12, R11, see FIG. 7a. Alternatively, the second smallest sprocket R11 can be formed integrally with two opposite connecting portions 60, and the smallest sprocket R12 can be joined to one of the connecting portions 60, see FIG. 7c. Alternatively, the smallest sprocket R12 can be formed integrally with a connecting portion 60 and the second smallest sprocket R11 can be joined at the connecting portion 60 of the smallest sprocket R12, see FIG. 7d. As is apparent in FIG. 7e, the joint 58 can run parallel or orthogonally to the axis of rotation 32 of the multi-sprocket arrangement 12. As is apparent in FIG. 7c, the joint 58 can have an axial offset.

Figure 8A:
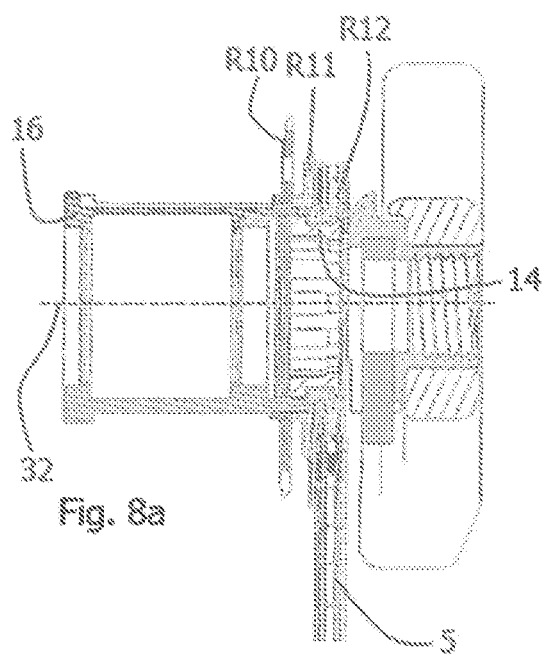
FIGS. 8a-c show rear wheel assemblies in various perspectives, in which a smallest sprocket of the multi-sprocket arrangement is in each case in engagement with a bicycle chain.
Figure 8B:
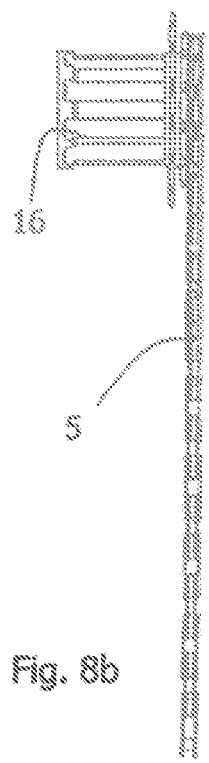
Figure 8C:
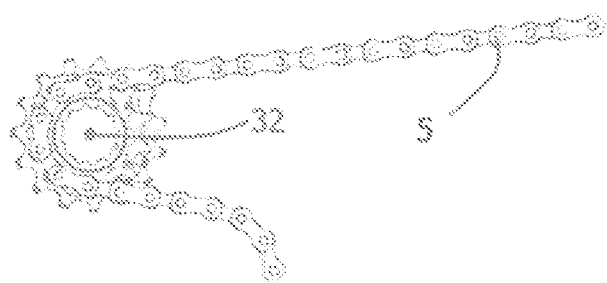

FIGS. 8a-c each show the smallest sprocket R12 that is received on the locking screw arrangement 14 in engagement with a bicycle chain 5. The bicycle chain 5 is driven via a front chain ring, not illustrated, and can cause the multi-sprocket arrangement 12 to rotate about the axis of rotation 32 thereof. The torque which is transmitted to the smallest sprocket R12 by the bicycle chain 5 is transmitted from the smallest sprocket R12 to at least one larger sprocket R10 which is connected in a torque-transmitting manner to the driver 16. The connecting portions 60 arranged between the sprockets also contribute to the transmission of torque between the sprockets R10, R11, R12. Latching mechanisms, such as intermeshing teeth and notches, can be provided in the region of the connecting portions 60 for the transmission of torque.

Figures 9A, 9B, 9C:
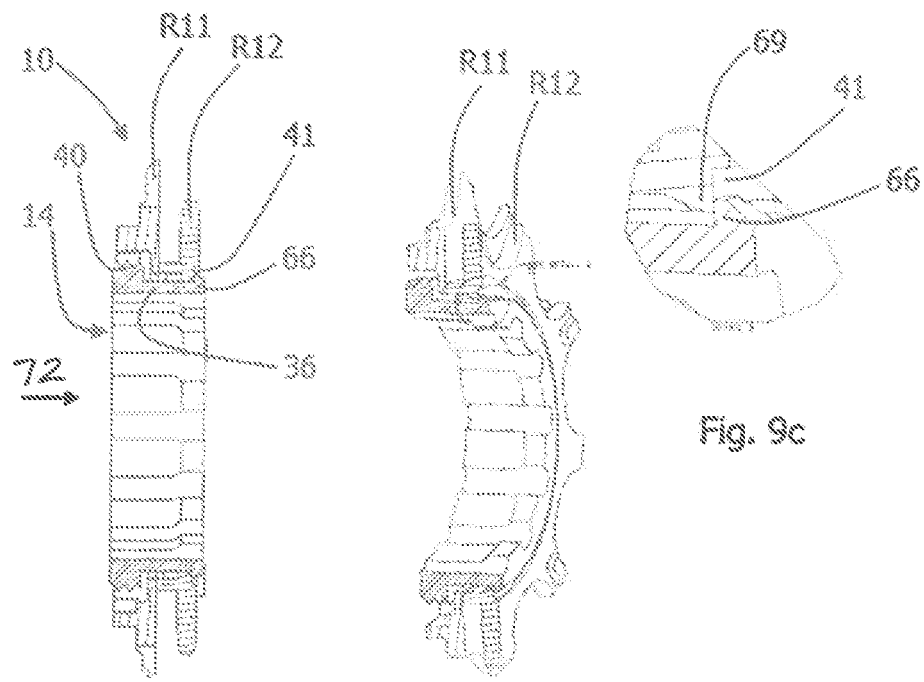
FIGS. 9a-c show sectional views of the multi-sprocket assembly with a locking screw arrangement according to a further embodiment.

FIGS. 9a-c show an alternative embodiment of the locking screw arrangement 14, in which the axially outer stop portion 38 is formed by a plurality of snap hooks 66. The snap hooks 66 are distributed over the outer circumference of the locking screw arrangement 14 and spaced apart from one another. This embodiment permits an integral design of the locking screw arrangement 14. Joints can therefore be dispensed with. For this purpose, the snap hooks 66 and optionally the shaft portion 36 have such an elasticity that the locking screw arrangement 14 can be pushed in the direction 72 indicated in FIG. 9a into the sprockets to be received until the recess 41 of the smallest sprocket R12 enters into engagement with the snap hooks 66, as illustrated in FIG. 9c. In the embodiment illustrated, the recess 41 is enlarged by a radially inwardly protruding protrusion 69 on the smallest sprocket R12.

Figures 10A, 10B:
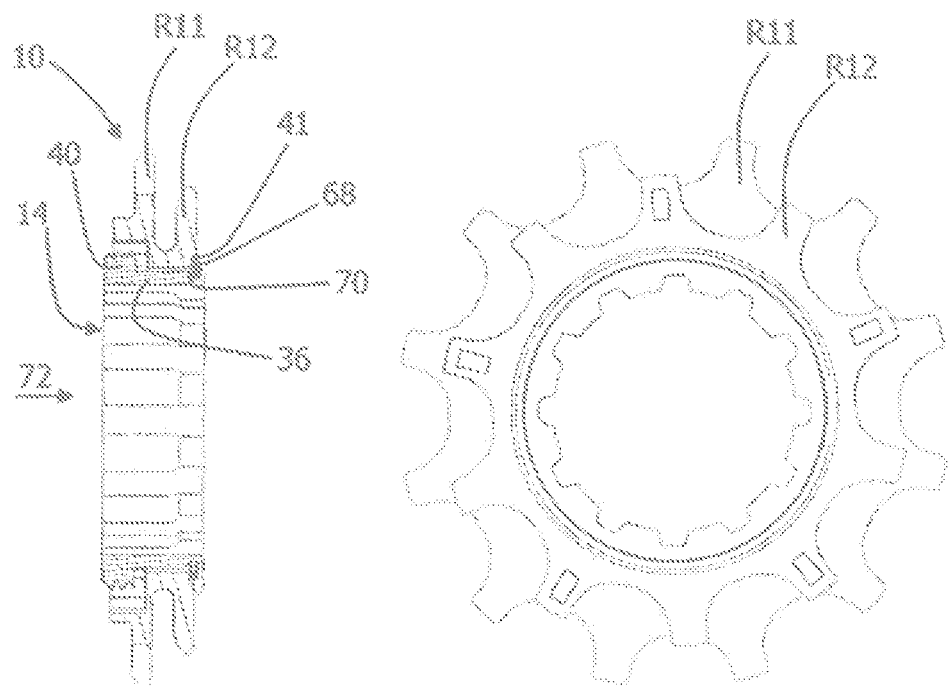
FIGS. 10a-b show a sectional view (FIG. 10a) and a side view (FIG. 10b) of a multi-sprocket assembly with a locking screw arrangement according to a further embodiment.

FIGS. 10a-b show an alternative embodiment of the locking screw arrangement 14, in which the axially outer stop portion 38 is formed by a securing element 68, for example in the form of a ring element. The securing element 68 engages both in the recess 41 of the smallest sprocket R12 and in a groove 70 furred in the end region of the shaft portion 36. The securing element 68 thereby produces an axial fixing of the sprockets received on the shaft portion. During the installation of the multi-sprocket assembly 10, the locking screw arrangement is pushed in the direction of the arrow 72 into the sprockets R12, R11 to be received until the sprockets are arranged in the region of the shaft portion. The securing element 68 is then brought into engagement with the recess 41 and the groove 70.

Figures 11A, 11B:
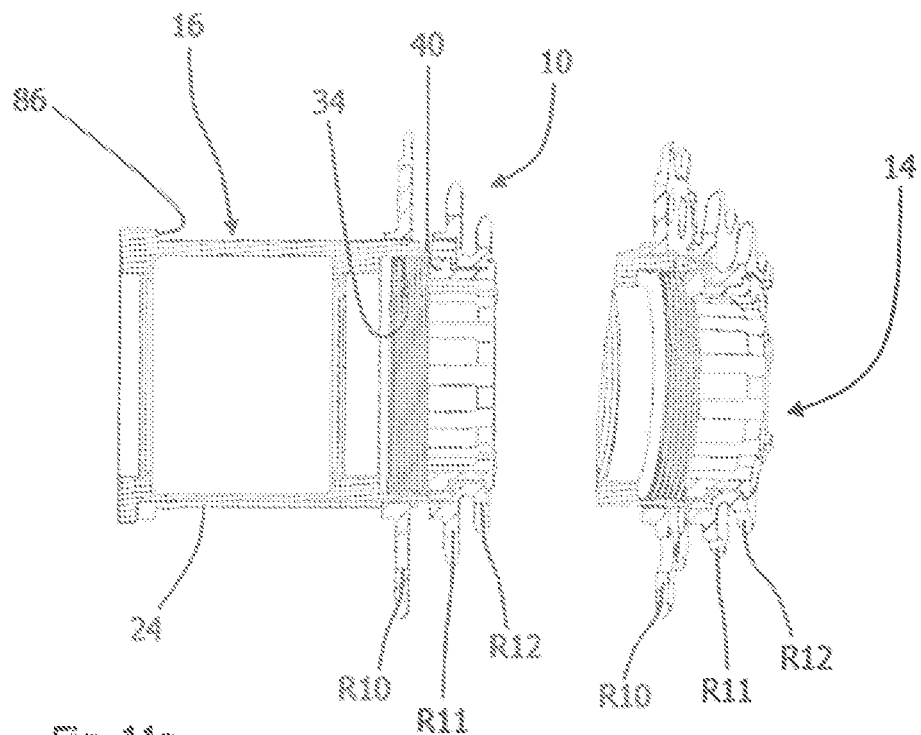
FIGS. 11a-b and 12a-b show sectional views of a rear wheel assembly in a state in which the multi-sprocket assembly and the driver are arranged on each other, but are not coupled to each other.

FIGS. 11a-b and 12a-b each show a sectional view of the rear wheel assembly 3 in a state in which the multi-sprocket assembly 10 and the driver 16 are arranged on each other, but are not coupled to each other. In the embodiment of the multi-sprocket arrangement 12 as is shown in FIGS. 11a-b, two smallest sprockets R11, R12 are connected to each other and are rotatable relative to the locking screw arrangement. A desired angular positioning of the sprockets R11, R12 received on the shaft portion relative to a further sprocket R10, which is non-rotatably coupled to the driver 16, can take place during or after the screwing of the locking screw arrangement 14 into the driver 16. This is possible since the sprockets R12, R11 received on the shaft portion are formed in a radially self-supporting manner, i.e. are not supported radially on the shaft portion, and can rotate relative to the locking screw arrangement 14. The two smallest sprockets R12, R11 can be radially fixed by a latching mechanism, for example a latching structure having teeth and notches is provided between the second smallest and the third smallest sprocket. Alternatively, a different joining method for the connection than latching can be selected. The above embodiment is optimized with respect to the production costs of the multi-sprocket arrangement.

Figures 12A, 12B:
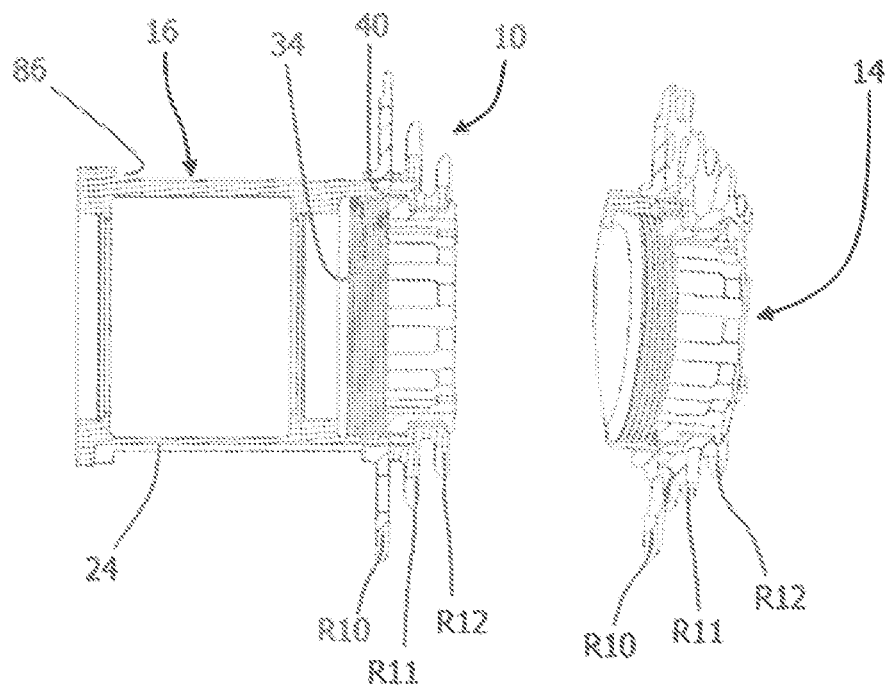
Figure 16A:
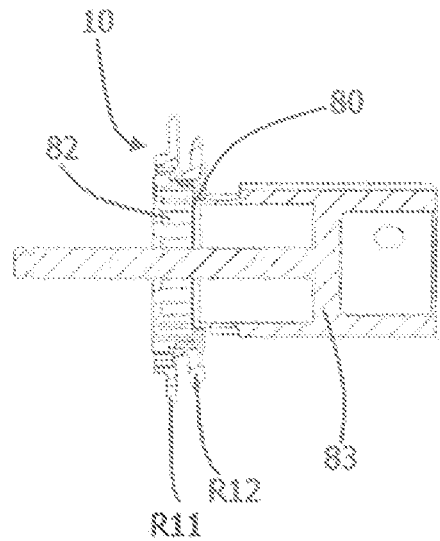
FIGS. 16a-b show a cross-sectional view (FIG. 16a) and a side view (FIG. 16b) of a tool in engagement with the second component of the two-part locking screw arrangement of the mufti-sprocket assembly according to the embodiment that is illustrated in FIGS. 13-15.
Figure 16B:
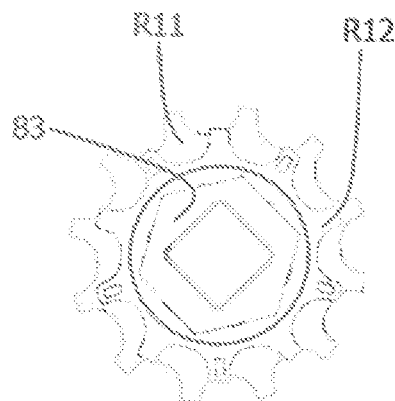

In the embodiment illustrated in FIGS. 12a-b, the two smallest sprockets R12, R11 received on the shaft portion are connected to the third smallest sprocket R10. That is to say, the angular positions of the three smallest sprockets relative to one another are already determined before the locking screw arrangement 14 is screwed into the driver 16. During the screwing of the locking screw arrangement 14 into the driver 16, the angular position of the three smallest sprockets can be adapted in such a manner that the third smallest sprocket R10 can engage in the driver profile 26 of the driver 16, as a result of which the desired angular position of the three smallest sprockets with respect to further sprockets of the multi-sprocket arrangement 12 is determined. The above embodiment provides simple installation of the sprockets of the multi-sprocket arrangement that are to be attached via the locking screw arrangement.

An embodiment in which the locking screw arrangement 14 is formed in two parts and comprises a first and a second component 74, 76 is described below. The two components 74, 76 are separable from each other. The two components 74, 76 illustrated in FIGS. 13a-d and 14a-d are connected to each other by intermeshing connecting threads 78, 79 which are arranged in the region of the shaft portion 36. The external thread 40 assigned to the shaft portion is arranged on the first component 74 and the axially outer stop portion 38 is arranged on the second component 76. The two components 74, 76 have a respective tool interface 80, 82, the tool interfaces permitting engagement of the same tool 83. The tool interfaces 80, 82 are arranged radially on the inside on an inner circumferential surface of the first and second component, respectively. FIG. 15 shows the two-part locking screw arrangement 14 with its two components 74, 76 on a common axis.

Figure 17:
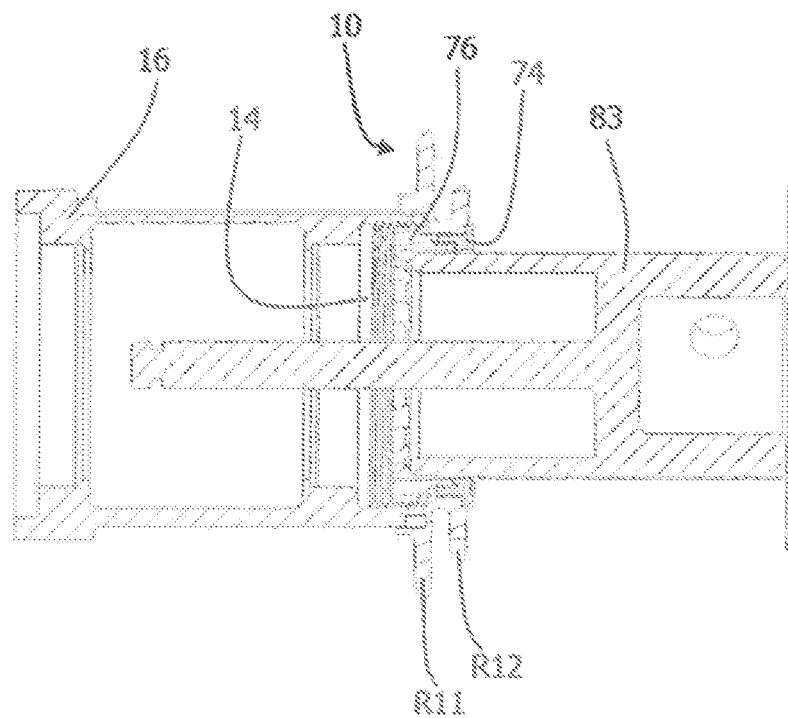
FIG. 17 shows a cross-sectional view of a tool in engagement with the two-part locking screw arrangement of the multi-sprocket assembly according to the embodiment that is illustrated in FIGS. 13-15.

In order to install the multi-sprocket assembly 10 with the two-part locking screw arrangement 14, the tool 83 engages either in one of the two components 74, 76, see FIG. 6a-b, or in both components 74, 76, see FIG. 17. The first component 74 can first be screwed into the driver 16 and then the second component 76 can be screwed into the first component 74. In this arrangement, the first component 74 acts as a diameter-imparting ring element. Alternatively, the two components 74, 76 can first be connected to each other before they are screwed into the driver 16. In both cases, before the two components 74, 76 are screwed together, the at least one smallest sprocket R12, R11 to be received is received in the region of the shaft portion 36 of one of the two components 74, 76. During the installation, the two components 74, 76 can first be screwed together up to the stop. Subsequently, one of the components 74, 76 can be rotated back until the tool interfaces 80, 82 of the two components 74, 76 are aligned with each other. With sufficient points of engagement of the tool and with a fine thread 78, 79, the rotating back should cause a small axial offset; with twelve points of engagement, the angle is, for example, approximately 29°.

The multi-sprocket assembly 10 is coupled or can be coupled to a driver 16. The driver 16, which is also referred to as a "standard driver" in specialists circles due to its widespread use, is illustrated in FIGS. 18a-c as a separate component with selected characteristic dimensions being indicated. On its radially outer circumferential surface, it has the driver profile 26 which extends radially outwards from a driver basic surface. The driver profile 26 comprises driver protrusions or what are referred to as splines 84. At least one of the splines 84 differs in its dimensions from the other splines of the driver profile 26. As a rule, sprockets to be fastened to the driver 16 have an inner contour formed in a complementary manner to the driver profile 26 of the driver 16. Sprockets with a corresponding inner contour and the driver 16 can thereby come into engagement in a torque-transmitting manner. For example, the number of splines is greater than or equal to 8, preferably greater than or equal to 9. The number of splines can also be less than or equal to 22.

The driver 16 has the driver profile 26 on a first region of its radial outer surface, which region extends along a first axial length LA1 axially outwards $A_a$ from a driver stop 86. A driver stop 86 generally refers to a portion of the driver 16, against which the multi-sprocket arrangement 12 which is fastened thereto strikes and by means of which the position of the multi-sprocket arrangement 12 can be determined in relation to the driver 16. This first axial length LA1 of the driver 16 is preferably greater than 32.9 mm, preferably 33.2+/−0.4 mm. An outer diameter dA1 in this first region as measured at radial outer surfaces of the driver profile 26, is, for example, greater than 34.2 mm, preferably 34.5+/−0.15 mm.

As is apparent in FIGS. 18a-c, the first region with the driver profile 26 is adjoined by a relatively short second region in which the radial outer surface of the driver 16 is free from the driver profile and is therefore smooth. A second axial length LA2 of the driver 16 extends from the driver stop 86 as far as an axially outer end side 88 of the driver 16 and is between 33.9 mm and 35.9 mm, but preferably 34.9+/−0.3 mm. An outer diameter dA2 of the second region can be larger than 31.4 mm and is preferably 32.1+0.4/−0.2 mm.

Furthermore, the driver 16 has the radially inwardly pointing internal thread 34 adjacent to its axially outer end side 88. The internal thread 34 preferably has a nominal diameter dA3 of greater than 29.8 mm and preferably of approximately 30.6 mm. A preferred pitch of the internal thread of the driver is 24 TPI, and therefore the thread can also be characterized according to known dimensioning as M 30.6×24 TPI.

The resulting characteristic dimensions in the mounted state of the rear wheel assembly 3 between the two opposite frame portions 1, 2 when the multi-sprocket assembly 10 is used with the driver 16 will be explained with respect to FIG. 3. In this mounted state, a first distance D1 in the axial direction from the driver stop 86 to the outer side surface 46 of the smallest sprocket R12 is greater than 38 mm, for example greater than 39.1 mm and even better 39.9+/−0.2 mm. A second distance D2 in the axial direction from the axially outer end side 88 of the driver 16 to the outer side surface 46 of the smallest sprocket R12 is greater than 4.0 mm and is preferably 5.0+/−0.2 mm. A third distance D3 in the axial direction from the outer side surface 46 of the smallest sprocket R12 to a circumferential surface 90 of the frame portion 1 or of the rear dropout 8 is smaller than 8.2 mm and is preferably 7.2+/−0.2 mm. In some cases, the frame portion 1 or its dropout 8 has a recessed surface 92 which serves for receiving the derailleur hanger 22. A fourth distance D4 in the axial direction from the outer side surface 46 of the smallest sprocket R12 to the recessed surface 92 can be smaller than 12.2 mm and is preferably 11.2+/−0.2 mm.

Figure 19A:
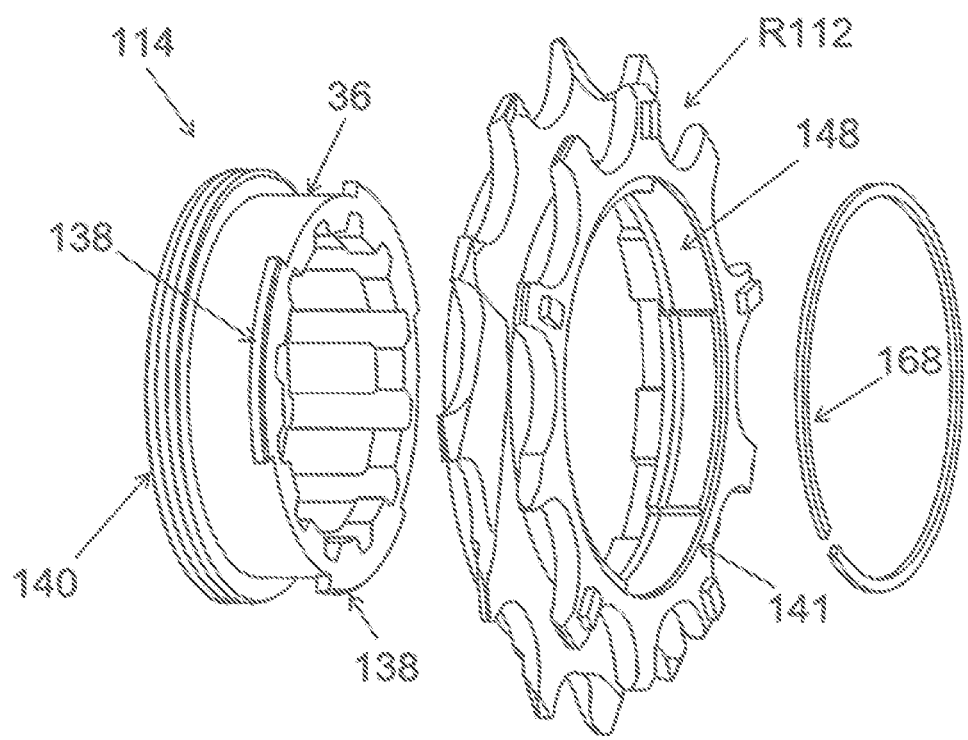
FIGS. 19a-b show views according to a further embodiment with a segmented locking screw arrangement and sprocket.
Figure 19B:
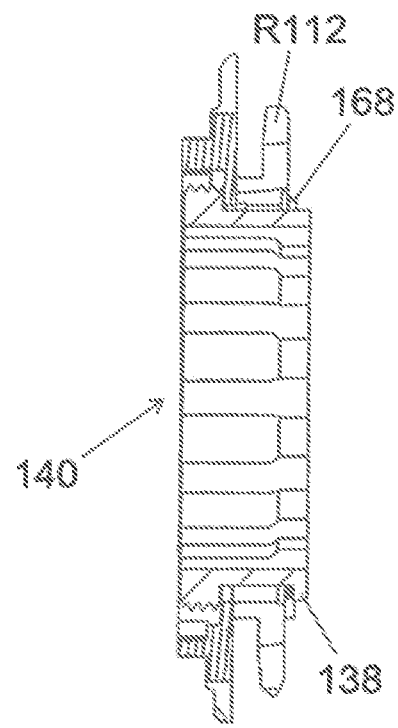
Figure 20:
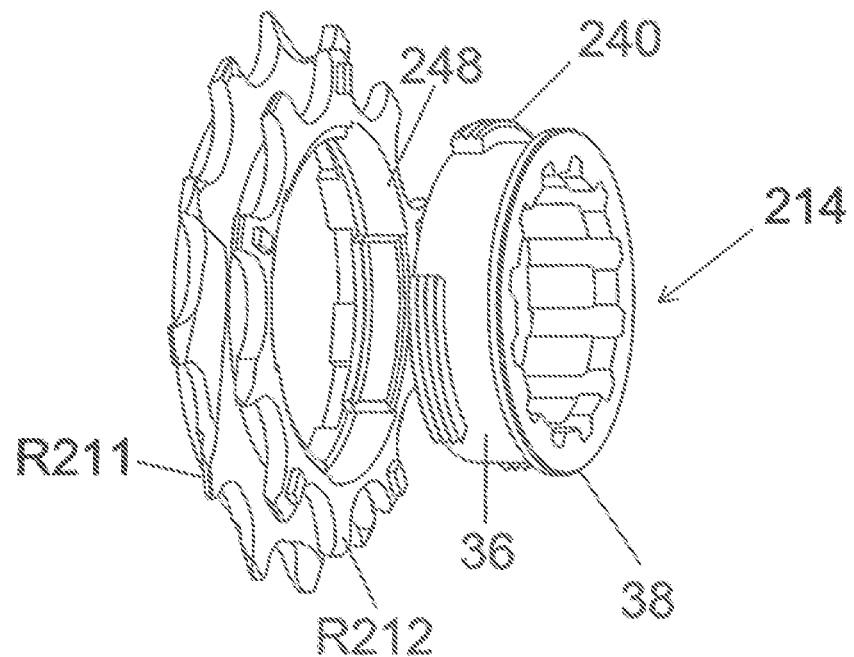
FIG. 20 shows a further embodiment of the locking screw arrangement with a segmented thread and sprocket.

The following embodiments shown in FIGS. 19 and 20 relate to a segmented locking screw arrangement. The segments are located at one or both axial ends 138, 240 of the outer circumferential surface of the locking screw arrangement. The segments of the locking screw arrangement comprise portions with alternating larger and smaller outer diameters and are coordinated with a likewise segmented inner circumferential surface of the smallest sprocket. The segments on the inner circumferential surface on the smallest sprocket likewise comprise portions with an alternating smaller and larger inner diameter. The segmented locking screw arrangement and the segmented sprocket can be mechanically connected and also separated again by plugging one into the other and rotating relative to each other—the principle of a bayonet locking.

FIGS. 19a and b show views of the first embodiment of the segmented locking screw arrangement 114. In this embodiment, the locking screw arrangement 114 has a shaft portion 36, a segmented stop portion 138 and an external thread 140. The segments on the stop portion 138 comprise portions with a larger outer diameter d1 and a smaller outer diameter d3. The outer diameter d1 of the portions with a larger outer diameter is larger than the outer diameter d3 of the shaft portion 36. The outer diameter d3 of the portions with the smaller outer diameter corresponds to the outer diameter d3 of the shaft portion 36. The thread 140 has an outer diameter d2 which is larger than the outer diameter d3 of the shaft portion 36.

The smallest sprocket R112 has a segmented inner circumferential surface with recesses 148. The segments 138 of the locking screw arrangement 114 are coordinated with the segments 148 of the smallest sprocket R112. The smallest sprocket R112 has an inner diameter d5 and three recesses 148 distributed along the inner circumference. An imaginary diameter along the recesses 148 is larger than the inner diameter d5 of the smallest sprocket R112 and also larger than the outer diameter d1 of the segments 138 of the locking screw arrangement 114. The two smallest sprockets are oriented with respect to the locking screw arrangement 114 in such a manner that the segments 138 of the locking screw arrangement 114 can pass the recesses 148 on the inner circumference of the smallest sprocket R112. When the sprockets R111 and R112 are plugged onto the locking screw arrangement 114 and positioned in the shaft portion 36, the sprockets are rotated relative to the screw arrangement 114, such that the segments 138 of larger diameter of the locking screw 114 engage behind the smallest sprocket R112 and are secured axially—cf. in this respect in particular FIG. 19b. The inner diameter d5 of the smallest sprockets R11, R112 received on the locking screw arrangement 114 is larger than the outer diameter d3 of the shaft portion 36, and therefore the locking screw arrangement 114 can rotate relative to the sprockets. The sprockets are formed in a self-supporting manner.

In addition, a securing element 168 can secure the sprockets R11 and R112 on the locking screw arrangement 114 in the axial direction. In the mounted state, the securing element 168 is arranged in the axial direction between the smallest sprocket R112 and the segmented stop portion 138. The securing element 168 can be designed as a snap ring. The smallest sprocket R112 can have a groove 141 for receiving the snap ring 168. The smallest sprockets R11 and R112 are fixed in the axial direction between the thread 140 of larger diameter and the segments 138 of larger diameter together with the snap ring 168.

FIG. 20 shows an alternative embodiment of the segmented locking screw arrangement 214, in which the outer circumferential surface of the locking screw arrangement 214 has a segmented threaded portion 240. The locking screw arrangement 214 comprises a stop portion 38, a shaft portion 36 and a segmented thread 240. The functional principle follows the previous embodiment. In this case, the external thread 240 is formed in a segmented manner and in an alternating manner comprises three threaded portions of larger diameter and three portions of smaller diameter without a thread. The threaded portions 240 have an outer diameter d2 which is of a larger size than the outer diameter d3 of the shaft portion 36. The stop portion 38 also has an outer diameter d1 which is of a larger size than the shaft portion 36—also compare in this respect the embodiments for FIG. 5.

The smallest sprocket R212 has a segmented inner circumferential surface with recesses 248. The segments 240 of the locking screw 214 are coordinated with the segments 248 of the smallest sprocket R212. The smallest sprocket R212 has an inner diameter d5 and three recesses 248 distributed along the inner circumference. An imaginary inner diameter along the recesses 248 is larger than the inner diameter d5 of the smallest sprocket R212 and is also larger than the outer diameter d1 of the stop portion 38 of the locking screw arrangement 214. The two smallest sprockets R211, R212 are oriented with respect to the locking screw arrangement 214 in such a manner that the segments 240 of the locking screw arrangement 214 can pass the recesses 248 on the inner circumference of the smallest sprocket R112. When the sprockets R211 and R212 are plugged onto the locking screw arrangement 214 and positioned in the shaft portion 36, the sprockets are rotated relative to the screw 214 such that the threaded segments 240 of larger diameter of the locking screw 214 engage behind the smallest sprocket R212 and are secured axially—cf. in this respect in particular FIG. 19b.

It is advantageous in this embodiment that neither an additional component (such as the snap ring) or joining technology is required. As soon as the smallest sprockets are mounted on the locking screw arrangement 214, they can no longer be pulled off axially outwards because of the axial stop portion 38. When, in a next step, the locking screw arrangement 214 with the sprockets R211, R212 is screwed over the threaded segments 240 with the internal thread 34 of the driver, the sprockets are also secured axially inwards.

In the embodiment shown in FIGS. 21a, 21b, the locking screw arrangement is first of all produced integrally and, in a further processing step, the outer diameter at one or both axial ends is enlarged by deformation. This permits cost-effective production without additional components or joining methods. The outer diameter of the axial stop portion and/or of the threaded portion can be enlarged by deformation, for example by crimping.

FIG. 21a shows a sectional view of the locking screw arrangement 314 produced integrally with the thread 40, the shaft portion 36 and the adjoining axial end which is not yet deformed. The axial end and the shaft portion 36 have the same outer diameter d3. FIG. 21b shows the deformed stop portion 338 with the enlarged outer diameter d1. By means of the deformation, the outer diameter d1 of the axially outer stop portion 338 is enlarged relative to the outer diameter d3 of the shaft portion 36. Alternatively, the threaded portion 40 of larger diameter could also be produced by deformation. Further machining steps, such as (re)threading, can follow.

Although the above exemplary embodiments relate to a multi-sprocket arrangement with twelve sprockets, the embodiments can equally be applied to a multi-sprocket arrangement with different numbers of sprockets, such as eleven or thirteen sprockets.

For better understanding, various aspects of the invention are mentioned below:

Aspect 1: Multi-sprocket assembly 10 for a rear wheel assembly 3 for a bicycle with a derailleur system, comprising a multi-sprocket arrangement 12 and a locking screw arrangement 14, wherein the multi-sprocket arrangement 12 is designed for torque-transmitting coupling to a driver 16 of the rear wheel assembly 3 and comprises at least eleven sprockets with differing numbers of teeth. The multi-sprocket assembly 10 is designed in such a manner that, in the mounted state, at least two of the smallest sprockets R11, R12 are axially fixed to the driver 16 via the locking screw arrangement 14. The locking screw arrangement 14 has a shank portion 36 for receiving at least one of the at least two smallest sprockets R11, R12. The shank portion 36 at its one end region is provided with an axially outer stop portion 38, and the shank portion 36 at its opposite end region is assigned at least one external thread 40 with which the locking screw arrangement 14 is screwable into an associated internal thread 34 for fixing the locking screw arrangement 14. The external thread 40 assigned to the shank portion has an outer diameter d2 which is larger than an outer diameter d3 of the shank portion 36 in that region in which the at least one of the at least two smallest sprockets R11, R12 is received.

Aspect 2: Multi-sprocket assembly 10 according to Aspect 1, wherein at least one sprocket R12 together with a connecting portion 60 assigned to said sprocket R12 is received on the shank portion 36. Preferably, two sprockets R11, R12 with a connecting portion 60 lying in between are received on the shank portion.

Aspect 3: Multi-sprocket assembly 10 according to either of the preceding aspects, wherein the at least one of the at least two smallest sprockets R11, R12 which is received on the shank portion 36 is formed in a self-supporting manner.

Aspect 4: Multi-sprocket assembly 10 according to one of the preceding aspects, wherein the external thread 40 assigned to the shank portion is formed integrally on the shank portion 36 or is produced integrally therewith, or/and the axially outer stop portion 38 is formed integrally on the shank portion 36 or is produced integrally therewith.

Aspect 5: Multi-sprocket assembly 10 according to one of the preceding aspects, wherein the locking screw arrangement 14 has at least one joint 52, 54, 56, and the at least one joint 52, 54, 56 runs in particular orthogonally or parallel to an axis of rotation 32 of the multi-sprocket arrangement 12.

Aspect 6: Multi-sprocket assembly 10 according to one of Aspects 1 to 3, wherein the axially outer stop portion. 38 is releasable from the shank portion 36 and is designed in the form of a securing element 68 which is connectable to the shank portion 36. Preferably, the securing element 68 engages in a groove 70 of the shank portion 36.

Aspect 7: Multi-sprocket assembly 10 according to one of the preceding aspects, wherein the axially outer stop portion 38 is formed by a plurality of snap hooks 66 which are arranged distributed over the outer circumference of the locking screw arrangement 14. The shank portion 36 or/and the snap hooks 66 has/have such an elasticity that a sprocket R12 or an arrangement of a plurality of sprockets R11, R12 is formed with an inner diameter d5 which is smaller than the outer diameter of the snap hooks 66 and which is pushable over the snap hooks 66 such that the sprocket or arrangement of a plurality of sprockets is received in the region of the shank portion 36.

Aspect 8: Multi-sprocket assembly 10 according to one of the preceding aspects, wherein the locking screw arrangement 14 comprises a first and a second component 74, 76 which are releasable from each other, the external thread 40 assigned to the shank portion is incorporated by the first component 74, and the axially outer stop portion 38 is incorporated by the second component 76.

Aspect 9: Multi-sprocket assembly 10 according to Aspect 8, wherein the first and the second components 74, 76 are screwable to each other.

Aspect 10: Multi-sprocket assembly 10 according to Aspect 8 or 9, wherein the first component 74 has a first tool interface 80 and the second component 76 has a second tool interface 82. The two tool interfaces 80, 82 are configured for the engagement of an identical tool 83 or of two different tools 83.

Aspect 11: Multi-sprocket assembly 10 according to Aspect 10, wherein the first component 74 furthermore has a first connecting thread 78 which is configured for engaging in a complementary second connecting thread 79 of the second component 76, wherein the connecting threads 78, 79 are arranged between the shank portion 36 and the external thread 40 assigned thereto, or are arranged in the region of the shank portion 36 or are arranged between the shank portion 36 and the stop portion 38.

Aspect 12: Multi-sprocket assembly 10 according to Aspect 11, wherein the connecting thread 78 of the first component 74 is an external thread and the complementary connecting thread 79 of the second component 76 is an internal thread, or wherein the connecting thread 78 of the first component 74 is an internal thread and the complementary connecting thread 79 of the second component 76 is an external thread.

Aspect 13: Multi-sprocket assembly 10 according to one of the preceding aspects, wherein the at least one sprocket R12 received on the shank portion 36 is rotatable relative to the locking screw arrangement 14.

Aspect 14: Multi-sprocket assembly 10 according to one of the preceding aspects, wherein the outer diameter d2 of the external thread 40 assigned to the shank portion is larger than an inner diameter d4 of the smallest sprocket of the multi-sprocket arrangement 12.

Aspect 15: Multi-sprocket assembly 10 according to one of the preceding aspects, wherein the smallest sprocket R12 of the multi-sprocket arrangement 12 has, on its outer side surface 46, a radially and axially extending recess 41 which is designed in such a manner that the axially outer stop portion 38 can engage therein.

Aspect 16: Multi-sprocket assembly 10 according to Aspect 15, wherein, when the axially outer stop portion 38 engages in the radial and axial cutout 41 of the smallest sprocket of the multi-sprocket arrangement 12, the outer side surface 46 of the smallest sprocket R12 lies further axially on the outside than an end side of the axially outer stop portion 38, or the outer side surface 46 of the smallest sprocket R12 is aligned with the end side of the axially outer stop portion 38, or the axially outer stop portion 38 protrudes by less than a maximum of 0.5 mm, preferably less than 0.2 mm, axially outwards from the outer side surface 46 of the smallest sprocket R12.

Aspect 17: Multi-sprocket assembly 10 according to one of the preceding aspects, wherein the locking screw arrangement 14 is formed integrally and is provided as a component which is 3D printed with the at least one sprocket R12 received on the shank portion 36.

Aspect 18: Multi-sprocket assembly 10 according to one of the preceding aspects, wherein: the driver 16 has on a first driver region of its radial outer surface a driver profile 26 which is arranged along a first axial driver length LA1 axially outwards $A_a$ from the driver stop 86. Furthermore, the first axial driver length LA1 is smaller than a second axial driver length LA2 which extends from the driver stop 86 as far as the axially outer end side 88 of the driver. Furthermore, the driver 16, on a second driver region of its radial outer surface, which region is adjacent to the axially outer end side 88 of the driver, is free from driver profiles. Furthermore, the driver 16 has an opening which extends radially outwards $R_a$ from a driver centre axis and axially inwards $A_i$ from the axially outer end side 88 of the driver, and wherein the opening has the internal thread 34 on its radial inner surface.

Aspect 19: Multi-sprocket assembly 10 according to Aspect 18, wherein the first axial driver length LA1 of the driver 16 from the driver stop 86 as far as the end of the driver profiles 26 is greater than 32.9 mm, is preferably 33.2+/−0.4 mm, or/and the second axial driver length LA2 of the driver 16 from the driver stop 86 as far as the axially outer end side 88 of the driver is greater than 34.2 mm, is preferably 34.9+/−0.3 mm, or/and a first driver outer diameter dA1 of the driver 16 in the first driver region along the first axial driver length LA1 of the driver is greater than 34.2 mm, is preferably 34.5+/−0.2 mm, or/and a second driver outer diameter dA2 of the driver 16 in the second driver region which is adjacent to the axially outer end side 88 of the driver is larger than 31.4 mm, is preferably 32.1+0.4/−0.2 mm, or/and a first driver inner diameter dA3 of the driver 16 axially adjacent to its axially outer end side 88 is larger than 29.8 mm, is preferably 30.6+/−0.2 mm.

Aspect 20: Multi-sprocket assembly 10 according to either of Aspects 18 and 19, wherein the multi-sprocket assembly 10 is designed in such a manner that, in the mounted state, the following applies: a first distance D1 in the axial direction from the driver stop 86 as far as the outer side surface 46 of the sprocket R12 with the smallest number of teeth is greater than 38.0 mm, is preferably greater than 39.1 mm, is even more preferably 39.9+/−0.2 mm, or/and a second distance D2 in the axial direction from the axially outer end side 88 of the driver 16 to an outer side surface 46 of the smallest sprocket R12 is greater than 4.0 mm, is preferably 5.0+/−0.2 mm.

Aspect 21: Multi-sprocket assembly 10 according to Aspects 19 and 20, wherein a first space utilization factor which arises from the ratio of the second driver length LA2 and the second distance D2 lies in a range of between 5 and 10.

Aspect 22: Multi-sprocket assembly 10 according to Aspect 21 or according to Aspects 19 and 20, wherein a second space utilization factor which arises from the ratio of the first driver length LA1 and the second distance D2 lies in a range of between 5 and 10.

Aspect 23: Multi-sprocket assembly 10 according to one of Aspects 18 to 22, wherein the carrier profile 26, on its outer circumferential surface, comprises splines protruding radially therefrom, wherein the number of splines is greater than or equal to eight, preferably greater than or equal to nine.

Aspect 24: Rear wheel assembly 3 for a bicycle with a derailleur system, comprising: a rear wheel hub 11 which can be arranged between two opposite frame portions 1, 2 of a bicycle frame, a driver 16 which is coupled rotatably to the rear wheel hub 11, and a multi-sprocket assembly 10 according to one of the preceding aspects. The multi-sprocket arrangement 12 of the multi-sprocket assembly 10 is non-rotatably coupled or couplable to the driver 16.

What is claimed is:

1. A multi-sprocket assembly for a rear wheel assembly for a bicycle with a derailleur system, comprising:
    a multi-sprocket arrangement; and
    a locking screw arrangement,
    wherein the multi-sprocket arrangement is configured to be couplable with a driver of the rear wheel assembly in a torque-transmitting manner, and comprises at least eleven sprockets with differing numbers of teeth,
    wherein the multi-sprocket assembly is configured such that, in a mounted state, at least two of the smallest sprockets are axially fixed to the driver via the locking screw arrangement,
    wherein the locking screw arrangement has a shaft portion for receiving at least one sprocket of the at least two smallest sprockets,
    wherein the shaft portion has an axially outer stop portion at one end region and at least one external thread at an opposite end region, the at least one external thread configured to be screwed into an associated internal thread to fix the locking screw arrangement,
    wherein the at least one external thread of the shaft portion has an outer diameter which is larger than an outer diameter of a region of the shaft portion that receives the at least one sprocket of the at least two smallest sprockets,
    wherein the axially outer stop portion is releasable from the shaft portion and is designed in the form of a securing element which is connectable to the shaft portion and engages only in a single groove of the shaft portion.

2. The multi-sprocket assembly according to claim 1, wherein the at least one sprocket of the at least two smallest sprockets together with a connecting portion of the at least one sprocket is received on the shaft portion.

3. The multi-sprocket assembly according to claim 1, wherein the at least two smallest sprockets with a connecting portion lying in between the two smallest sprockets are received on the shaft portion.

4. The multi-sprocket assembly according to claim 1, wherein the at least one sprocket of the at least two smallest sprockets which is received on the shaft portion is formed in a self-supporting manner.

5. The multi-sprocket assembly according to claim 1, wherein the at least one external thread of the shaft portion is formed integrally on the shaft portion or is produced integrally therewith.

6. The multi-sprocket assembly according to claim 1, wherein the locking screw arrangement has at least one joint, and the at least one joint runs orthogonally or parallel to an axis of rotation of the multi-sprocket arrangement.

7. The multi-sprocket assembly according to claim 1, wherein the locking screw arrangement comprises a first component and a second component which are releasable from one another, the at least one external thread assigned to the shaft portion is incorporated by the first component, and the axially outer stop portion is incorporated by the second component.

8. The multi-sprocket assembly according to claim 7, wherein the first and second components are screwable to each other.

9. The multi-sprocket assembly according to claim 7, wherein the first component has a first tool interface, and the second component has a second tool interface, wherein the first and second tool interfaces are configured for the engagement of an identical tool or two different tools.

10. The multi-sprocket assembly according to claim 7, wherein the first component has a first connecting thread configured to engage in a complementary second connecting thread of the second component, the first and second connecting threads are arranged in a region of the shaft portion, wherein the first connecting thread is one of an external thread and an internal thread and the complementary second connecting thread is the other of the external thread and the internal thread.

11. The multi-sprocket assembly according to claim 1, wherein the at least one sprocket of the at least two smallest sprockets received on the shaft portion is rotatable relative to the locking screw arrangement.

12. The multi-sprocket assembly according to claim 1, wherein the outer diameter of the external thread of the shaft portion is larger than an inner diameter of a smallest sprocket of the multi-sprocket arrangement.

13. The multi-sprocket assembly according to claim 1, wherein a smallest sprocket of the multi-sprocket arrangement has, on its outer side surface, a radially and axially extending recess which is designed in such a manner that the axially outer stop portion can engage therein.

14. A rear wheel assembly for a bicycle with a derailleur system, comprising:
    a rear wheel hub which can be arranged between two opposite frame portions of a bicycle frame,
    a driver rotatably coupled to the rear wheel hub; and
    a multi-sprocket assembly comprising:
        a multi-sprocket arrangement, and
        a locking screw arrangement,
        wherein the multi-sprocket arrangement is configured to be torque-transmitting coupled to the driver of the rear wheel assembly, and comprises at least eleven sprockets with differing numbers of teeth,
        wherein the multi-sprocket assembly is configured such that, in the mounted state, at least two of the smallest sprockets are axially fixed to the driver via the locking screw arrangement,
        wherein the locking screw arrangement has a shaft portion for receiving at least one sprocket of the at least two smallest sprockets,
        wherein the shaft portion has an axially outer stop portion at one end region and at least one external thread at an opposite end region, the at least one external thread configured to be screwed into an associated internal thread to fix the locking screw arrangement, wherein the at least one external thread of the shaft portion has an outer diameter which is larger than an outer diameter of a region of the shaft portion that receives the at least one of the at least two smallest sprockets, wherein the axially outer stop portion is releasable from the shaft portion and is designed in the form of a securing element which is connectable to the shaft portion and engages only in a single groove of the shaft portion, wherein the multi-sprocket arrangement of the multi-sprocket assembly is non-rotatably coupled to the driver.

\* \* \* \* \*